United States Patent [19]
Carter et al.

[11] Patent Number: 5,909,540
[45] Date of Patent: Jun. 1, 1999

[54] SYSTEM AND METHOD FOR PROVIDING HIGHLY AVAILABLE DATA STORAGE USING GLOBALLY ADDRESSABLE MEMORY

[75] Inventors: John B. Carter, Salt Lake City, Utah; Scott H. Davis, Groton, Mass.; Daniel J. Dietterich, Acton, Mass.; Steven J. Frank, Hopkinton, Mass.; Robert S. Phillips, Brookfield, Mass.; John Woods, Boxborough, Mass.; David Porter, Littleton, Mass.; Hsin H. Lee, Acton, Mass.

[73] Assignee: Mangosoft Corporation, Westborough, Mass.

[21] Appl. No.: 08/848,967

[22] Filed: May 2, 1997

Related U.S. Application Data

[63] Continuation-in-part of application No. 08/754,481, Nov. 22, 1996, and application No. 08/827,534, Mar. 28, 1997.

[51] Int. Cl.⁶ .................................................. G06F 11/00
[52] U.S. Cl. ........................................................ 395/182.02
[58] Field of Search ........................ 395/182.02, 183.01, 395/185.01, 183.16, 200.31, 200.44, 200.45, 200.51, 406; 707/10, 202; 711/6, 162, 202, 203

[56] References Cited

U.S. PATENT DOCUMENTS

| | | | |
|---|---|---|---|
| 4,096,567 | 6/1978 | Millard et al. | 364/200 |
| 4,426,688 | 1/1984 | Moxley | 365/200 |
| 4,710,926 | 12/1987 | Brown et al. | 371/9 |
| 4,868,738 | 9/1989 | Kish et al. | 364/200 |
| 4,934,764 | 6/1990 | Leitermann et al. | 312/111 |
| 5,055,999 | 10/1991 | Frank et al. | 364/200 |
| 5,077,736 | 12/1991 | Dunphy, Jr. et al. | 371/10.1 |
| 5,117,350 | 5/1992 | Parrish et al. | 395/425 |
| 5,119,481 | 6/1992 | Frank et al. | 395/325 |

(List continued on next page.)

FOREIGN PATENT DOCUMENTS

| | | | |
|---|---|---|---|
| 0 288 636 A2 | 11/1988 | European Pat. Off. | G06F 15/16 |
| 0 661 651 A1 | 7/1995 | European Pat. Off. | G06F 17/30 |
| 2 257 273 | 1/1993 | United Kingdom | G06F 12/02 |
| WO 95/02307 | 1/1995 | WIPO | H04Q 7/30 |
| WO 95/14279 | 5/1995 | WIPO | G06F 17/30 |
| WO 95/22111 | 8/1995 | WIPO | G06F 17/30 |
| WO 95/25306 | 9/1995 | WIPO | G06F 12/08 |
| WO 96/23268 | 8/1996 | WIPO | G06F 17/30 |
| WO 96/30847 | 10/1996 | WIPO | G06F 17/30 |

OTHER PUBLICATIONS

"Support for Collaborative Design: Agents and Emergence, Edmonds et al.," Communications of the ACM, Jul. 1994, vol. 37, No. 7, pp. 41–47.

"Software Agents," Genesereth et al., Communications of the ACM, Jul. 1994, vol. 37, No. 7, pp. 48–53.

Anderson et al. "Scheduler Activations: Effective Kernel Support for the User–Level Management of Parallelism," *Operating Systems Review* (SIGOPS), vol. 25, No. 1, Jan. 1, 1991, pp. 95–109.

(List continued on next page.)

*Primary Examiner*—Robert W. Beausoliel, Jr.
*Assistant Examiner*—Stephen C. Elmore
*Attorney, Agent, or Firm*—Testa, Hurwitz & Thibeault LLP

[57] ABSTRACT

A network of computer node interface to globally addressable memory system that provides persistent storage of data exchange periodic connectivity information. The exchanged connectivity information provides information regarding node failure to other nodes in the system, and the surviving nodes use the information to determine which node, if any, has ceased functioning. Various processes are used to recover the portion of the global address space for which the failed node was responsible, including RAM directory, disk directory, or file system information. Additionally, nodes may be subdivided into groups and connectivity information is exchanged between nodes belonging to a group. Each group then exchanges group-wise connectivity information and failures may be recovered.

14 Claims, 13 Drawing Sheets

U.S. PATENT DOCUMENTS

| | | | |
|---|---|---|---|
| 5,226,039 | 7/1993 | Frank et al. | 370/60 |
| 5,245,563 | 9/1993 | Hauck, Jr. | 364/745 |
| 5,247,673 | 9/1993 | Costa et al. | 395/650 |
| 5,251,308 | 10/1993 | Frank et al. | 395/425 |
| 5,274,789 | 12/1993 | Costa et al. | 711/206 |
| 5,282,201 | 1/1994 | Frank et al. | 370/94.1 |
| 5,297,265 | 3/1994 | Frank et al. | 395/400 |
| 5,313,647 | 5/1994 | Kaufman et al. | 395/700 |
| 5,335,325 | 8/1994 | Frank et al. | 395/200 |
| 5,341,483 | 8/1994 | Frank et al. | 395/400 |
| 5,390,316 | 2/1995 | Cramer et al. | 395/425 |
| 5,390,326 | 2/1995 | Shah | 395/575 |
| 5,394,555 | 2/1995 | Hunter et al. | 711/148 |
| 5,408,649 | 4/1995 | Beshears et al. | 395/575 |
| 5,423,037 | 6/1995 | Hvasshovd | 395/600 |
| 5,452,447 | 9/1995 | Nelson et al. | 395/600 |
| 5,490,272 | 2/1996 | Mathis et al. | 395/650 |
| 5,493,728 | 2/1996 | Solton et al. | 395/250 |
| 5,513,314 | 4/1996 | Kandasamy et al. | 395/182.04 |
| 5,519,855 | 5/1996 | Neeman et al. | 395/600 |
| 5,522,045 | 5/1996 | Sandberg | 395/200 |
| 5,551,035 | 8/1996 | Arnold et al. | 395/650 |
| 5,560,027 | 9/1996 | Watson et al. | 395/800 |
| 5,560,029 | 9/1996 | Papadopoulos | 395/800 |
| 5,588,147 | 12/1996 | Neeman et al. | 395/601 |
| 5,592,625 | 1/1997 | Sandberg | 395/200 |
| 5,613,079 | 3/1997 | Debique et al. | 395/468 |
| 5,617,537 | 4/1997 | Yamada et al. | 395/200 |
| 5,649,194 | 7/1997 | Miller et al. | 707/200 |
| 5,675,787 | 10/1997 | Miller et al. | 707/104 |
| 5,687,308 | 11/1997 | Jardine et al. | 395/182.02 |
| 5,689,700 | 11/1997 | Miller et al. | 707/10 |
| 5,701,462 | 12/1997 | Whitney et al. | 395/610 |
| 5,727,150 | 3/1998 | Laudon et al. | 395/200 |
| 5,768,510 | 6/1998 | Gish | 395/200.33 |
| 5,781,537 | 7/1998 | Ramaswami et al. | 370/254 |
| 5,805,785 | 9/1998 | Dias et al. | 395/182.02 |
| 5,805,786 | 9/1998 | Badovinatz et al. | 395/182.02 |
| 5,812,533 | 9/1998 | Cox et al. | 370/259 |
| 5,812,751 | 9/1998 | Ekrot et al. | 395/182.02 |
| 5,832,514 | 11/1998 | Norin et al. | 707/202 |

OTHER PUBLICATIONS

Barton–Davis et al. "Adding Scheduler Activations to Mach 3.0," *Proceedings of the USENIX Mach III Symposium,* Santa Fe, NM, USA, Apr. 19–21, 1993, pp. 119–136.

Dryden, P. "Users throwing cache at networks delays" *Computerworld,* Oct. 7, 1996, http://ww.computerworld.com/search/AT–html/9610/961007SL41cacheb.html, originally printed on May 22, 1997, reprinted on Nov. 18, 1998.

Enterprise Networking Web Page, http://www.lancache.com/enad1.html, printed on May 20, 1997.

Koppe C. "Sleeping Threads: A Kernel Mechanism for Support of Efficient User Level Threads," *Proceedings of Seventh IASTED–ISMM International Conference on Parallel and Distributed Computing and Systems,* Washington, DC, Oct. 19–21, pp. 11–15.

Measurement Techniques Inc. Web Page, http://www.lan-cache.com/pr1_4.html, printed May 20, 1997.

Measurement Techniques Inc. Web Page, http://www.lan-cache.com/slc.html, printed on May 20, 1997.

Network Appliance, Inc. Web Page, http://www.netapp.com/news/level3b/news_rel_970421.html, printed on May 22, 1997.

Network Appliance, Inc. Web Page, http://www.netapp.com/products/level3/netcache/datasheet.html, printed on May 22, 1997.

Network Appliance, Inc. Web Page, http://www.netapp.com/products/level3/webfiler.html, printed on May 22, 1997.

Peak Technologies, Inc. Web Page, http://www.peak–media.com/PeakJet/quick.html, printed on May 20, 1997.

Peak Technologies, Inc. Web Page, http://www.peakJet/PeakJet.html, printed on May 20, 1997.

Relay Web Page, http://www.relay.com/product/gold.html, printed on May 22, 1997.

Relay Web Page, http://www.relay.com/product/otg.html, printed on May 22, 1997.

Sequel Technology Web Page, http://www.sequeltech.com/product/netPIM/prodinfo.html, printed on May 22, 1997.

European Patent Office, European Search Report, Appliation No. EP 97 30 9471, mailed on Apr. 23, 1998, 3 pages.

Patent Cooperation Treaty, International Search Report, International Application No. PCT/US 97/21457, mailed on Apr. 23, 1998, 4 pages.

Patent Cooperation Treaty, International Search Report, International Application No. PCT/US 97/21458, mailed on Apr. 23, 1998, 3 pages.

Patent Cooperation Treaty, International Search Report, International Application No. PCT/US 97/21459, mailed on Apr. 23, 1998, 4 pages.

Patent Cooperation Treaty, International Search Report, International Application No. PCT/US 97/21460, mailed on Apr. 23, 1998, 5 pages.

Patent Cooperation Treaty, International Search Report, International Application No. PCT/US 97/21466, mailed on Apr. 23, 1998, 3 pages.

Patent Cooperation Treaty, International Search Report, International Application No. PCT/US 97/21733, mailed on Apr. 23, 1998, 3 pages.

Patent Cooperation Treaty, International Search Report, International Application No. PCT/US 97/21734, mailed on Apr. 23, 1998, 4 pages.

Anderson, T., et al. "Serverless Network File Systems," *Operating Systems Review (SIGOPS),* vol. 29, No. 5, Dec. 1, 1995, pp. 109–126.

Carter, J., et al. "Network Multicomputing Using Recoverable Distributed Shared Memory," *Proceedings of the Spring Computer Society International Conference (COMPCON),* San Francisco, Feb. 22–26, 1993, pp. 519–527.

Huber, J., et al al. "PPFS: A High Performance Portable Parallel File System," *Proceedings of the International Conference on Supercomputing,* Barcelona, Jul. 3–7, 1995, pp. 385–394.

"Java Dynamic Class Loader," *IBM Technical Disclosure Bulletin,* vol. 39, No. 11, Nov. 1996, pp. 107–108.

Lee, E., et al. "Petal: Distributed Virtual Disks," *7th International Conference on Architectural Support for Programming Languages and Operation Systems,* Cambridge, MA, Oct. 1–5, 1996, pp. 84–92.

Neal, D. "The Harvest Object Cache in New Zealand," *Computer Networks and ISDN Systems,* vol. 11, No. 28, May 1996, pp. 1415–1430.

Raghavan, G. "A Domain Model of WWW Browsers," *Proceedings of Southeastcon, Bringing Together Education, Science and Technology,* Tampa, Apr. 11–14, 1996, pp. 436–439.

Ng, T. "The Design and Implementation of a Reliable Disbrituted Operating System–ROSE," *Proceedings of the Symposium on Reliable Distributed Systems,* Huntsville, Oct. 9–11, 1990, pp. 2–11.

Yeung, D., et al. "MGS" A Multigrain Shared Memory System, *Computer Architecture News,* vol. 24, No. 2, May 1, 1996, pp. 44–55.

Henskens et al. "Course and Fine Grain Objects in a Distributed Persistent Store," *Object Orientation in Operating Systems,* 1993, IEEE, pp. 116–123.

Amaral et al. "A Model for Persistent Shared Memory Addressing in Distributed Systems," *Object Orientation in Operating Systems,* 1992, IEEE, pp. 2–11.

Irelenbusch et al. "Towards a Resilient Shared Memory Concept for Distributed Persistent Object Systems," *Proceedings of the 28th Annual Hawaii Intl. Conference on System Sciences,* 1995, IEEE, pp. 675–684.

Lea et al. "COOL: System Support for Distributed Programming," *Communications of the ACM,* vol. 36, No. 9, pp. 37–46.

Wilson, Andrew W., "Organization and Statistical Simulation of Hierarchical Multiprocessors," UMI Dissertation Information Service (1985).

Li, Kai, "Shared Virtual Memory on Loosely Coupled Multiprocessors," Yale University, Department of Computer Science, (Sep., 1986).

Wilson, Andrew W., "Hierachical Cache/Bus Architecture for Shared Memory Multiprocessors," *ACM,* pp. 242–252 (1987).

Carter, J.B. et al., "Optimistic Implementation of Bulk Data Transfer Protocols," *In Proceedings of the 1989 Signetrics Conference,* pp. 61–69 (May, 1989).

Carter, J.B. et als., "Distributed Operating Systems Based on a Protected Global Virtual Address Space," in the Proceedings of the Third Workshop on Workstation Operating Systems (WWOS)(May, 1992).

Carter, J.B. et als., "FLEX: A Tool for Building Efficient and Flexible Systems," In the Proceedings of the Fourth Workshop on Workstation Operating Systems ((WWOS)(Oct., 1993).

Carter, John B., "Design of the Munin Distributed Shared memory System," To appear in the special issue of the *Journal of Parallel and Distributed Computing* on distributed shared memory(1995).

Carter, J.B. et als., "Techniques for Reducing Consistency–Related Communication in Distributed Shared Memory Systems," *ACM Transactions on Computer Systems,* pp. 205–243, vol. 13, No. 3 (Aug., 1995).

Carter, J.B. et als., "Reducing Consistency Traffic and Cache Misses in the Avalanche Multiprocessor," University of Utah technical report.

Stac Inc. Web Page, http://www.stac.com/replica/pr–legato-agreement.html, printed on May 22, 1997.

Tricord Systems, Inc. Web Page, http://www.tricord.com/2/10/10–3–96.html, printed on May 22, 1997.

Network Appliance, Inc. Web Page, http://www.netapp.com/products/level 3/nfs.html, printed on May 22, 1997.

Network Appliance, Inc. Web Page, http://www.netapp.com/products/level3/ontap.html, printed on May 22, 1997.

Network Appliance, Inc. Web Page, http://www.netapp.com/products/level3/windows.html, printed on May 22, 1997.

SYSTEM AND METHOD FOR PROVIDING HIGHLY AVAILABLE DATA STORAGE USING GLOBALLY ADDRESSABLE MEMORY

CROSS-REFERENCE TO RELATED APPLICATIONS

This application is a continuation-in-part of co-pending U.S. patent application Ser. No. 08/754,481 filed Nov. 22, 1996 and co-pending U.S. patent application Ser. No. 08/827,534, filed Mar. 28, 1997.

TECHNICAL FIELD

The present invention relates in general to distributed data storage systems and, more specifically, to systems and methods that maintain a highly available distributed store of data.

BACKGROUND INFORMATION

Computer based structured storage systems, such as computer file systems and database systems, have been remarkably successful at providing users with quick and facile access to enormous amounts of data. The importance of these structured storage systems in today's commerce is difficult to exaggerate. For example, structured storage systems have allowed businesses to generate and maintain enormous stores of persistent data that the company can modify and update over the course of years. For many companies, this persistent data is a valuable capital asset that is employed each day to perform the company's core operations. The data can be, for example, computer files (e.g., source code, wordprocessing documents, etc.), database records and information (e.g., information on employees, customers, and/or products), and/or Web pages. Such data must be "highly available," i.e., the data must be available despite system hardware or software failures, because it is often used for day-to-day decision making processes.

Previous efforts to provide high availability or fault tolerance have included both hardware techniques, such as providing redundant systems, and software approaches, such as redundant array of independent disks (RAID) technology and clustering. Each one of these efforts has its own unique drawbacks.

Redundant systems are typified by double or triple redundancy. These types of systems provide more than one complete machine to accomplish the task of one machine. Each machine performs the same operations in parallel. If one machine fails or encounters an error, the additional machines provide the correct result. Such systems, while highly tolerant of system faults, are extremely expensive. In effect, multiple networks of machines must be provided to implement each network.

A similar fault-tolerant approach for storage is RAID. RAID technology may be implemented as disk mirroring (so-called RAID I) or disk striping with parity (so-called RAID V). Disk mirroring provides highly fault tolerant storage but is expensive, since multiple disks, usually two, must be provided to store the data of one disk. Disk striping with parity has poor performance for intensive write applications, since each time data is written to the array of disks a parity block must be calculated. Disk striping provides rigid N+1 redundancy and suffers additional performance degradation after the first error since the missing block (or blocks) must be recalculated each time a read operation is performed. Finally, such rigid N+1 redundancy schemes have no way of "healing" themselves, that is, after one error the system in no longer N+1 redundant.

Other software approaches to improve the reliability and operation of centralized structured storage network systems have generally involved: (1) static mapping of the data to one or more servers and associated disks (sometimes referred to as "shared nothing" clustering); (2) storing the data in shared data repository, such as a shared disk (sometimes referred to as "shared everything" clustering); and (3) database replication.

Systems using the first method distribute portions of the data store across a plurality of servers and associated disks. Each of the servers maintains a portion of the structured store of data, as well as optionally maintaining an associated portion of a directory structure that describes the portions of the data stored within that particular server. These systems guard against a loss of data by distributing the storage of data statically across a plurality of servers such that the failure of any one server will result in a loss of only a portion of the overall data. However, although known clustered database technology can provide more fault tolerant operation in that it guards against data loss and provides support for dual-path disks, the known systems still rely on static allocation of the data across various servers. Since data is not dynamically allocated between servers: (1) system resources are not allocated based on system usage which results in under utilization of those resources; (2) scaleable performance is limited because new servers must be provided whenever the dataset grows or whenever one particular server cannot service requests made to its portion of the dataset; and (3) such static allocation still requires at least one of servers storing the information to survive in order to preserve the data. Also, failure of one server requires a second server to serve the data previously served by the down server, which degrades system performance.

Systems using the second method store the data stored in a shared data repository, such as a shared disk. The shared disks may be shared between a subset of system nodes or between all nodes of the system. Each node in the system continually updates the central data repository with its portion of the structured store. For example, in a database system, each node exports tables it is currently using to the data store. While this method exports the problems of load balancing to the central data repository, it suffers from two main drawbacks. First, throughput is lowered because of increased overhead associated with ensuring coherency of the centralized data store. Second, locking is inefficient because entire pages are locked when a node accesses any portion of a page. As a result, nodes may experience contention for memory even when no true conflict exists.

Similar to disk mirroring, but at a higher level, are techniques based on database replication. These systems may provide replication of the data stores or of the transactions performed on the data stores. Accordingly, these systems go further in guarding against the loss of data by providing static redundancy within the structured storage system. However, such systems suffer from the same drawbacks as other static techniques described above. Additionally, so-called "transaction-safe" replication techniques suffer from scalability problems as the number of tables served increases.

SUMMARY OF THE INVENTION

The present invention relates to data storage systems that are more reliable and provide greater fault tolerant operation than present data storage systems that suffer no performance degradation when an error in encountered. The novel systems described herein achieve self-healing N+1 redundancy for disk storage, RAM storage, and structured data storage by distributing system data and data structures throughout a globally addressable memory space, a portion of which is hosted by one of more different nodes on a network. Because each node locally hosts system pages it is currently accessing, the system has the ability to dynamically move data in response to network activity levels and access patterns in order to optimize performance and minimize node access times. The system further provides distributed control for a plurality of different types of structured storage systems, such as file systems, database systems, and systems that store, share, and deliver Web pages to requesting nodes.

The system is further capable of repairing errors encountered during operation because system data is distributed across network nodes. Appropriate data structures and operating policies are provided that allow the system to identify when a node has damaged or missing information. The information can be located, or regenerated, and is redistributed to other nodes on the network to return the system to N+1 redundancy. Optionally, a shared memory system can be employed, such as a distributed shared memory system (DSM) that distributes the storage of data across some or all of the memory devices connected to a network. Memory devices that may be connected to the network include hard disk drives, tape drives, floppy disk drive, CD-ROM drives, optical disk drives, random access memory chips, or read-only memory chips.

In one aspect, the invention relates to a method for continuing operation after a node failure in a system for providing distributed control over data. A number of nodes are inter-connected by a network and the nodes periodically exchange connectivity information. Stored on each node is an instance of a data control program for manipulating data. Accordingly, multiple, distributed instances of the data control program exist throughout the network. Each instance of the data control program interfaces to a distributed shared memory system that provides distributed storage across the inter-connected nodes and that provides addressable persistent storage of data. Each instance of the data control program is operated to employ the shared memory system as a memory device having data contained therein. The shared memory system coordinates access to the data to provide distributed control over the data. Exchanged connectivity information is used to determine the failure of a node. Once a node failure is recognized, the portion of the data for which the failed node was responsible is determined.

In another aspect, the invention relates to a method for continuing operation after a node failure in a system for providing distributed control over data. A number of nodes are inter-connected by a network and the nodes periodically exchange connectivity information. Stored on each node is an instance of a data control program for manipulating data. Accordingly, multiple, distributed instances of the data control program exist throughout the network. Each instance of the data control program interfaces to a globally addressable data store that provides distributed storage across the inter-connected nodes and that provides addressable persistent storage of data. Each instance of the data control program is operated to employ the globally addressable data store as a memory device having data contained therein. The globally addressable data store coordinates access to the data to provide distributed control over the data. Exchanged connectivity information is used to determine the failure of a node. Once a node failure is recognized, the portion of the data for which the failed node was responsible is determined.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

A network system 10 according to the invention includes a plurality of network nodes that access a memory space storing a structured store of data, such as a structured file system or a database. Each of the nodes includes at least a data control program which accesses and manages the structured store of data. The structured store of data may be stored in an addressable shared memory or the structured store may be stored in a more traditional fashion. For example, each node may be responsible for storing a particular element or elements of the structured store of data. In such an embodiment, the data control program can access a desired portion of the structured store using a globally unique identifier. The underlying system would translate the identifier into one or more commands for accessing the desired data, including network transfer commands. In another embodiment, the structured store of data is stored in an addressable shared memory space, which allows the nodes to transparently access portions of the structured store using standard memory access commands.

The system 10 can be a file system, a database system, a Web server, an object repository system, or any other structured storage system that maintains an organized set of data. As used herein, the term "Web server" means any processor that transmits data objects (such as Active X objects), applications (such as JAVA applets), or files (such as HTML files), to a requester via Web protocols (e.g., http or ftp). In one disclosed embodiment, the system 10 is a file system that maintains various computer files. However, this is just one embodiment of the invention that is provided for illustrative purposes. The invention can be employed to provide any one of a plurality of structured storage systems (e.g., database system, Web page system, Intranet, etc.). The invention is not to be limited to the file system or other particular embodiments described herein.

Figure 1:
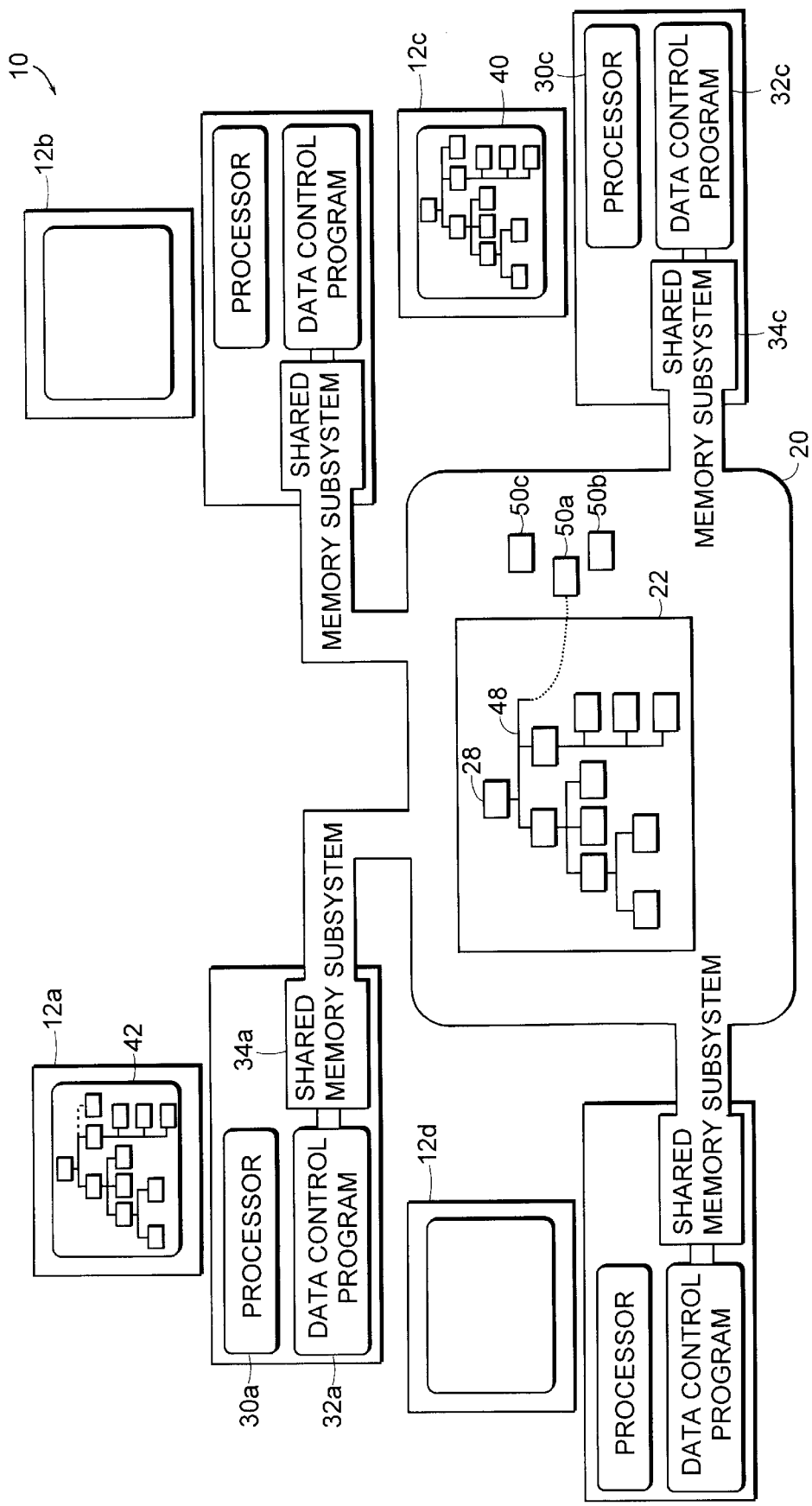
FIG. 1 is a conceptual block diagram of a distributed addressable shared memory structured data storage system according to the invention.

Referring to FIG. 1, a network system 10 according to the invention includes a plurality of network nodes 12a–12d and an addressable shared memory space 20 that has a portion 22 for storing a structured store of data 28. Each of the nodes 12a–12d can include several sub-elements. For example, node 12a includes a processor 30a, a data control program 32a, and a shared memory subsystem 34a. In the disclosed embodiment, two of the nodes, 12a and 12c, include monitors that provide displays 40 and 42 graphically depicting the structured store of data 28 within the addressable shared memory space 20. The addressable shared memory space 20 interconnects each of the network nodes 12a–12d and provides each node 12a–12d with access to the structured store of data 28 contained within the addressable shared memory space 20.

A system 10 according to the invention can provide, among other things, each network node 12a–12d with shared control over the structured store of data 28 and, therefore, the system 10 can distribute control of the data store across the nodes of the network. To this end, each node of the system 10, such as node 12a, includes a data control program 32a that interfaces to a shared memory subsystem 34a. The data control program 32a can operate as a structured storage system, such as a file system, that is adapted to maintain a structured store of data and to employ the shared memory system as an addressable memory device that can store a structured store of data. At the direction of the data control program 32a, the shared memory subsystem 34a can access and store data within the addressable shared memory space 20. These cooperating elements provide a structured storage system that has a distributed architecture and thereby achieves greater fault tolerance, reliability, and flexibility than known structured storage systems that rely on centralized control and centralized servers. Accordingly, the invention can provide computer networks with distributively controlled and readily scaled file systems, database systems, Web page systems, object repositories, data caching systems, or any other structured storage system.

It is necessary to maintain a list of all nodes present in the network (12a–d in FIG. 1) and interconnection information for the nodes in order to provide various system functionalities. In one embodiment, the node information is used to provide a level of failure recovery, which will be described in more detail below.

Any data structure for maintaining a list of nodes may be used so long as the list remains relatively compact. It is also desirable that the list of network nodes is independent of network technology, which means that network addresses should not be directly used. In one embodiment, a unique identification code is assigned to each node 12a–d in the network. The identification code assigned to each node should not change.

A network as described throughout the specification, may include many thousands of nodes that are geographically dispersed or located on distinct networks. Maintaining a flat list of nodes for such a network topology results in an extreme amount of list maintenance overhead. Therefore, it is generally desirable to add some structure to the node list in order to reduce maintenance overhead.

Figure 2:
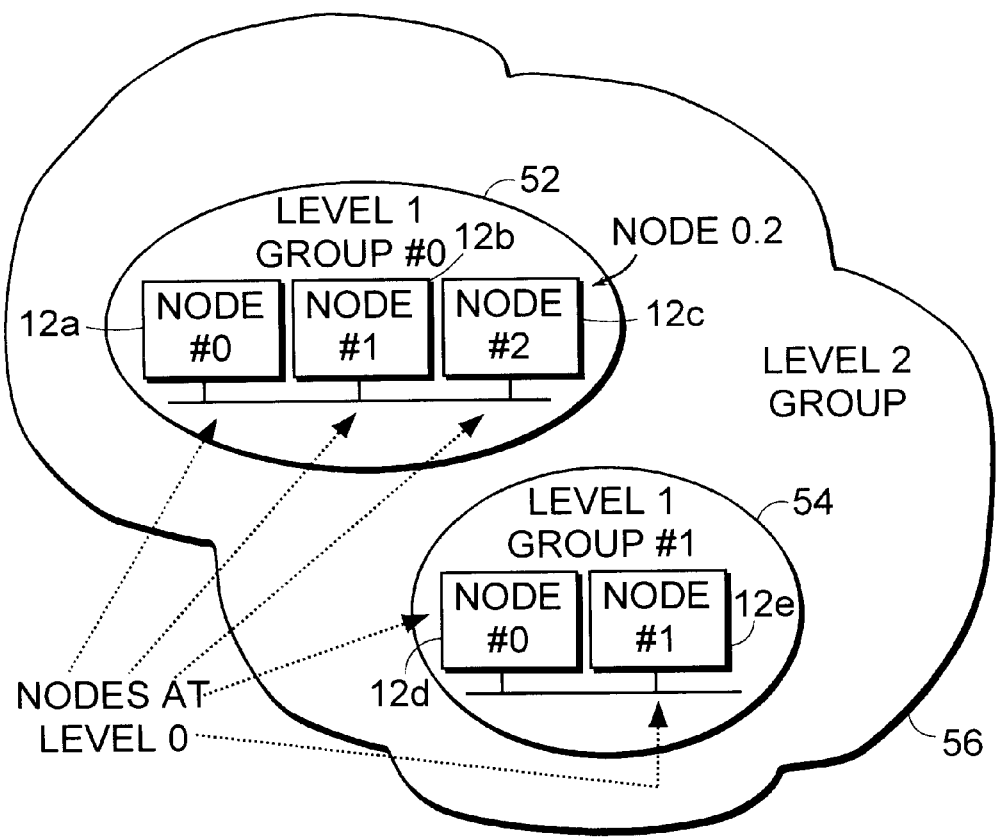
FIG. 2 is a diagrammatic view of an embodiment for logically organizing network nodes.

Referring to the embodiment depicted in FIG. 2, nodes 12a–e are collected into groups of nodes 52, 54 that may be defined to reflect various network topologies. Groups of nodes may also be grouped. This leads to a tree-structured hierarchy of nodes and groups. There is one "root" group 56 that includes as members every group and node present in the network. Further efficiencies may be achieved by limiting group size to a predetermined number of nodes.

In the embodiment described by FIG. 2, group membership is expected to change infrequently, if at all. In general, when a node 12a–e is introduced into the network, it is configured into a particular group 52, 54, and the node's group affiliation should change only as a result of a command issued by the network administrator.

For example, for embodiments in which nodes are grouped and the number of nodes belonging to any one group is bounded, two forms of identification may be assigned to each node. A short form of identification may be assigned that encodes grouping information and therefore may change, however infrequently, with network topology or logical organization. Also, a longer form of identification may be assigned to each node that is guaranteed to remain unchanged. The latter form is primarily used to refer to each node 12a–e in the network.

For example, a group of nodes 52, 54 may be limited to 64 members, requiring 6 bits to encode the identification information for each node. Accordingly, 12 bits would allow the system to uniquely identify any node in the network when more than one group of nodes exists, up to a maximum of 64 groups. For networks in which more than 64 groups of nodes exist, groups of nodes must be themselves grouped and 18 bits would be required to uniquely identify any node in the system.

Each node 12a–e may also be assigned a permanent identification code that is invariant for the life of the node. Permanent identification codes may be constructed using a global address component to make it unique in space and a date or time component to make it unique in time. Thus, in this embodiment, a node's permanent identification code will consist both of an address and a time-stamp to ensure that it is unique.

Referring once again to FIG. 1, the system 10 of the invention maintains within the addressable shared memory space 20 a structured store of data 28. Each of the nodes 12a–12d can access the addressable shared memory space 20 through the shared memory subsystems 34a–34d. Each of the shared memory subsystems 34a–34d provides its node with access to the addressable shared memory space 20. The shared memory subsystems 34a–34d coordinate each of the respective node's memory access operations to provide access to the desired data and maintain data coherency within the addressable shared memory space 20. This allows the interconnected nodes 12a–12d to employ the addressable shared memory space 20 as a space for storing and retrieving data. At least a portion of the addressable shared memory space 20 is supported by a physical memory system that provides persistent storage of data. For example, a portion of the addressable shared memory space 20 can be assigned or mapped to one or more hard disk drives that are on the network or associated with one or more of the network nodes 12a–12d as local hard disk storage for those particular nodes. Accordingly, FIG. 1 illustrates that systems of the invention have shared memory subsystems providing the network nodes with access to an addressable shared memory space, wherein at least a portion of that space is assigned to at least a portion of one or more of the persistent storage memory devices (e.g., hard disks) to allow the nodes addressably to store and retrieve data to and from the one or more persistent storage memory devices. A preferred embodiment of such an addressable shared memory space is described in the commonly-owned U.S. patent application Ser. No. 08/754,481 filed Nov. 22, 1996, and incorporated by reference above.

Therefore, one realization of the present invention is that each of the nodes 12a–12d can employ its respective shared memory subsystem as a memory device that provides persistent data storage.

Each of the data control programs 32a–32d is a software module that couples to the respective shared memory subsystem 34a–34d in a way that operates similarly to an interface between a conventional data storage program and a local memory device. For example, the data control program 32a can stream data to, and collect data from, the shared memory subsystem 34a. Because the shared memory subsystems coordinate the memory accesses to the addressable shared memory space 20, each of the data control programs is relieved from having to manage and coordinate its activities with the other data control programs on the network or from having to manage and coordinate its activities with one or more central servers. Accordingly, each of the data control programs 32a–32d can be a peer incarnation (i.e., an instance) residing on a different one of the network nodes 12a–12d and can treat the respective shared memory subsystem 34a–34d as a local memory device such as a local hard disk.

One or more of the data control programs 32a–32d can provide a graphical user interface 42 that graphically depicts the structured store of data 28 contained within the addressable shared memory space 20. The graphical user interface 42 allows a user at a node, for example at node 12a, to insert data objects graphically within the structured store of data 28. To this end, the data control program 32a can generate a set of commands that will present a stream of data to the shared memory subsystem 34a and the shared memory subsystem 34a will employ the data stream to store an object within the structured store of data 28. Similarly, the other shared memory subsystems 34b–34d can provide information to their respective nodes that is indicative of this change to the structured store of data 28. Accordingly, as shown depicted in FIG. 1 for node 12c only for simplicity, that node (which includes a graphical user interface 40) reflects the change to the structured store of data 28 affected by the data control program 32a of the node 12a. In particular, the graphical user interface 40 of the node 12c can depict to a user that an object is being placed within the structured store of data 28. For example, the addressable shared memory space 20 also contains the data objects 50a–50c which can be placed within the structured data store 28 to become part of that structured data store. As illustrated, a system user at node 12a can direct object 50a to be inserted at a set location within the data store 28. The data control program 32a then directs the shared memory subsystem 34a to place the object 50a within the data store 28 at the proper location. Moreover, the shared memory subsystem 34c on node 12c detects the change within the data store 28 and reflects that change within the graphical user interface 40.

Figure 3:
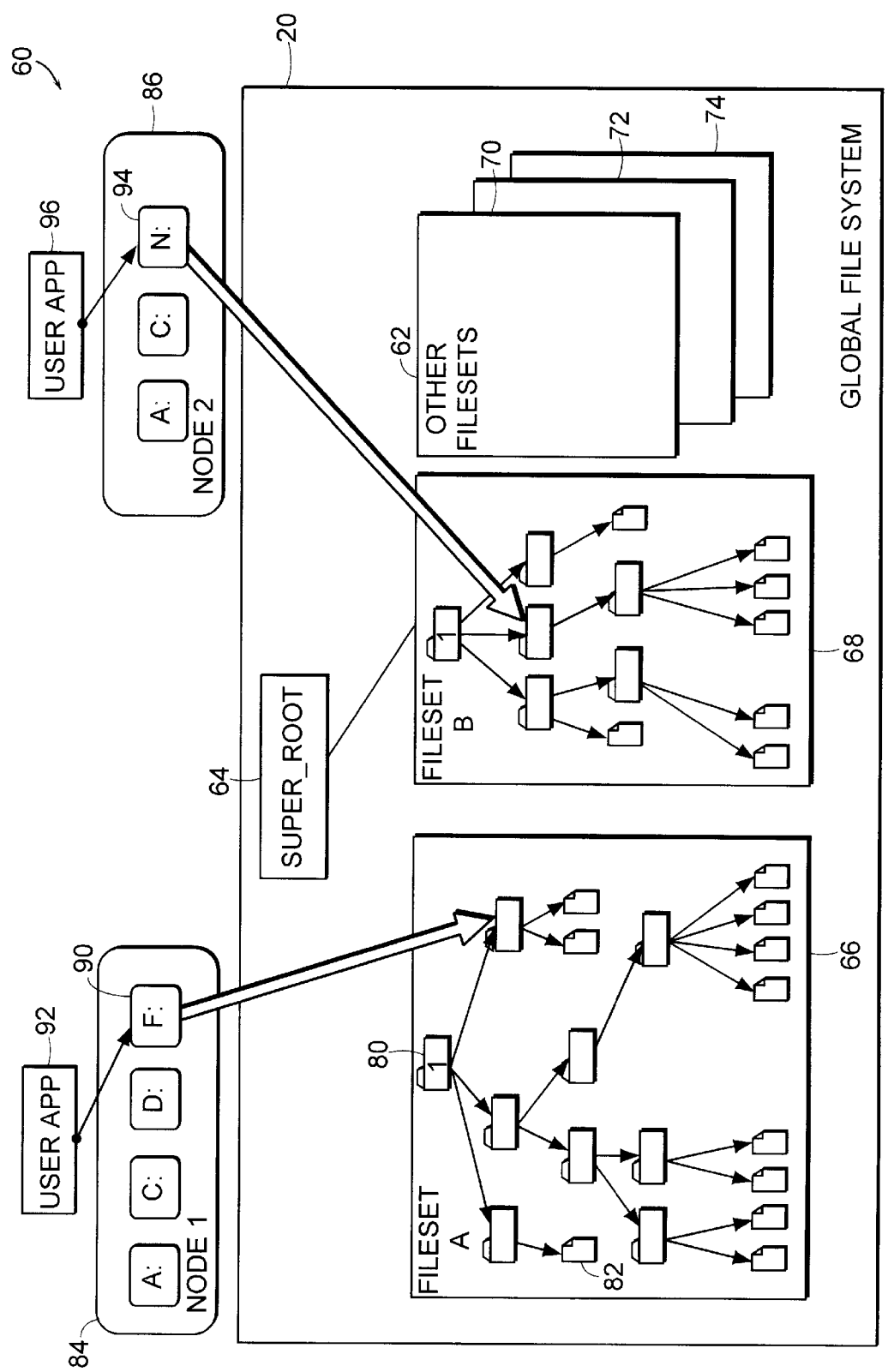
FIG. 3 is a diagram of one possible embodiment of the system of FIG. 1, namely a distributed addressable shared memory file system providing storage for computer files such as source code files, wordprocessing documents files, etc.

Referring now to FIG. 3, a structured file system 60 is a particular embodiment according to the invention that employs the properties of the addressable shared memory space 20 to implement what looks to all network nodes like a coherent, single file system when in fact it spans all network nodes coupled to the addressable shared memory space 20.

The file system 60 of FIG. 3 differs from known physical and distributed file systems in a variety of ways. In contrast to known physical file systems that map a file organization onto disk blocks, the file system 60 according to the invention manages the mapping of a directory and file structure onto a distributed addressable shared memory system 20 which has at least a portion of its addressable space mapped or assigned to at least a portion of one or more persistent storage devices (e.g., hard disks) on the network. Unlike known distributed file systems, the file system 60 of the invention employs peer nodes, each of which have an incarnation or instance of the same data control program. Also, unlike known file systems generally, the file system 60 of the invention: maintains data coherence among network nodes; automatically replicates data for redundancy and fault tolerance; automatically and dynamically migrates data to account for varying network usage and traffic patterns; and provides a variety of other advantages and advances, some of which are disclosed in the commonly-owned U.S. patent application Ser. No. 08/754,481 filed Nov. 22, 1996, and incorporated by reference above.

Still referring to FIG. 3, the file system 60 resides in part within the addressable shared memory space 20, and includes a structured store of data 62, a super root 64, file sets 66–74, directory entry 80, and file or document 82. Two network nodes 84 and 86 are shown accessing the addressable shared memory space 20 (in the manner described previously with reference to FIG. 1) via the logical drives 90 and 94. Application programs 92 and 96 executing on the nodes interact with the data control programs (not shown in FIG. 3 but shown in FIG. 1 as 32a–32d) and cause the data control programs in the nodes to access the logical drives 90 and 94. In the disclosed embodiment, the logical drives are DOS devices that "connect to" the fileset directories via Installable File System drivers associated with the file system 60.

The file system 60 supports one global file system per addressable shared memory space 20 shared by all of the network nodes. This global file system is organized into one or more independent collections of files, depicted as the filesets 66–74. A fileset can be considered logically equivalent to a traditional file system partition. It is a collection of files organized hierarchically as a directory tree structure rooted in a root directory. The non-leaf nodes in the tree are the directories 80, and the leaves in the tree are regular files 82 or empty directories. Sub-directory trees within a fileset can overlap by linking a file to multiple directories.

A benefit of breaking up the file system 60 into filesets 66–74 is that it provides more flexible file system management for users of the system 60. As the file system 60 grows into very large sizes (e.g., hundreds of nodes with thousands of gigabits of storage), it is desirable to have the files organized into groups of management entities such that management actions can be independently applied to individual groups without affecting the operation of the others.

The filesets in the addressable shared memory space 20 are described and enumerated in a common structure, the root 64 of which provides the starting point to locate the filesets in the addressable shared memory space 20. The root 64 can be stored in a static and well-known memory location in the addressable shared memory space 20, and it can be accessed via a distributed shared memory system program interface. When a node is accessing a fileset for the first time, it first looks up the root 64 to determine the identifier associated with the fileset, e.g., the shared memory address used to access the fileset. Once it has determined the identifier, the node can access the root directory of the fileset. From the root directory, it then can traverse the entire fileset directory tree to locate the desired file. Filesets used by the file system 60 are described in greater detail below under the heading "Fileset."

Figure 4:
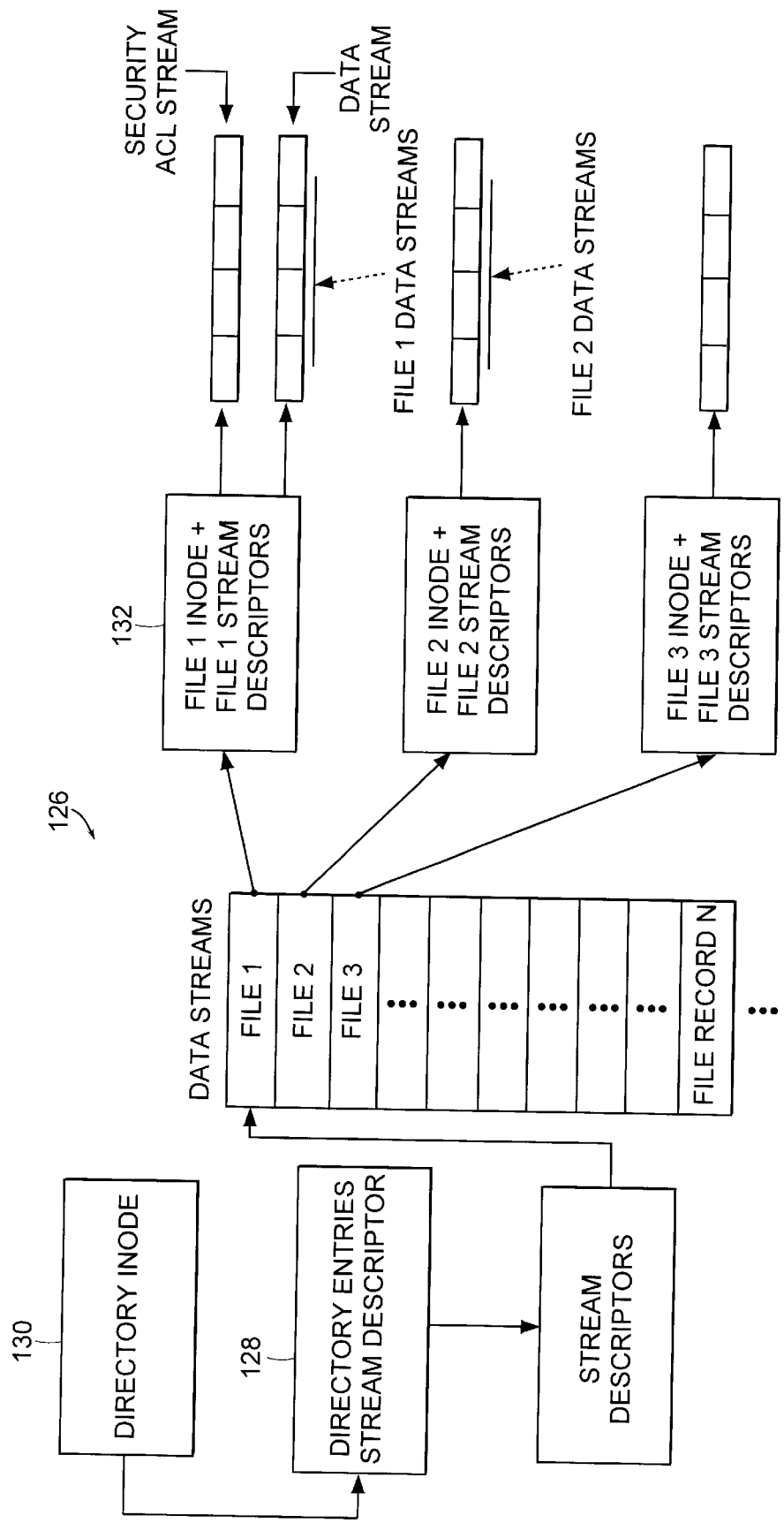
FIG. 4 is a graphical representation of the organization of directory entries and associated file descriptors (also known as "Inodes"), suitable for use with the file system of FIG. 3.

Referring to FIG. 4, in the disclosed embodiment of the file system 60 according to the invention, a directory 126 (such as the directory 80 of FIG. 2) is accessed by starting at a directory Inode or descriptor 128 containing an address that points to a directory entries stream descriptor 130. This descriptor 130 is a pointer to a block of data containing directory entries for files File 1 through File 3. The directory entry for File 1 has a number of entries; one of the entries is a string containing the name of the file and another entry is the address of the Inodes and stream descriptors 132. The stream descriptors for File 1 are used to locate and retrieve the various 4 kilobyte pages in the addressable shared memory space 20 that constitute File 1. Other files are retrieved and constructed from the addressable shared memory space 20 in the same fashion. The directories used by the file system 60 are described in greater detail below under the heading "Directory."

Figure 5:
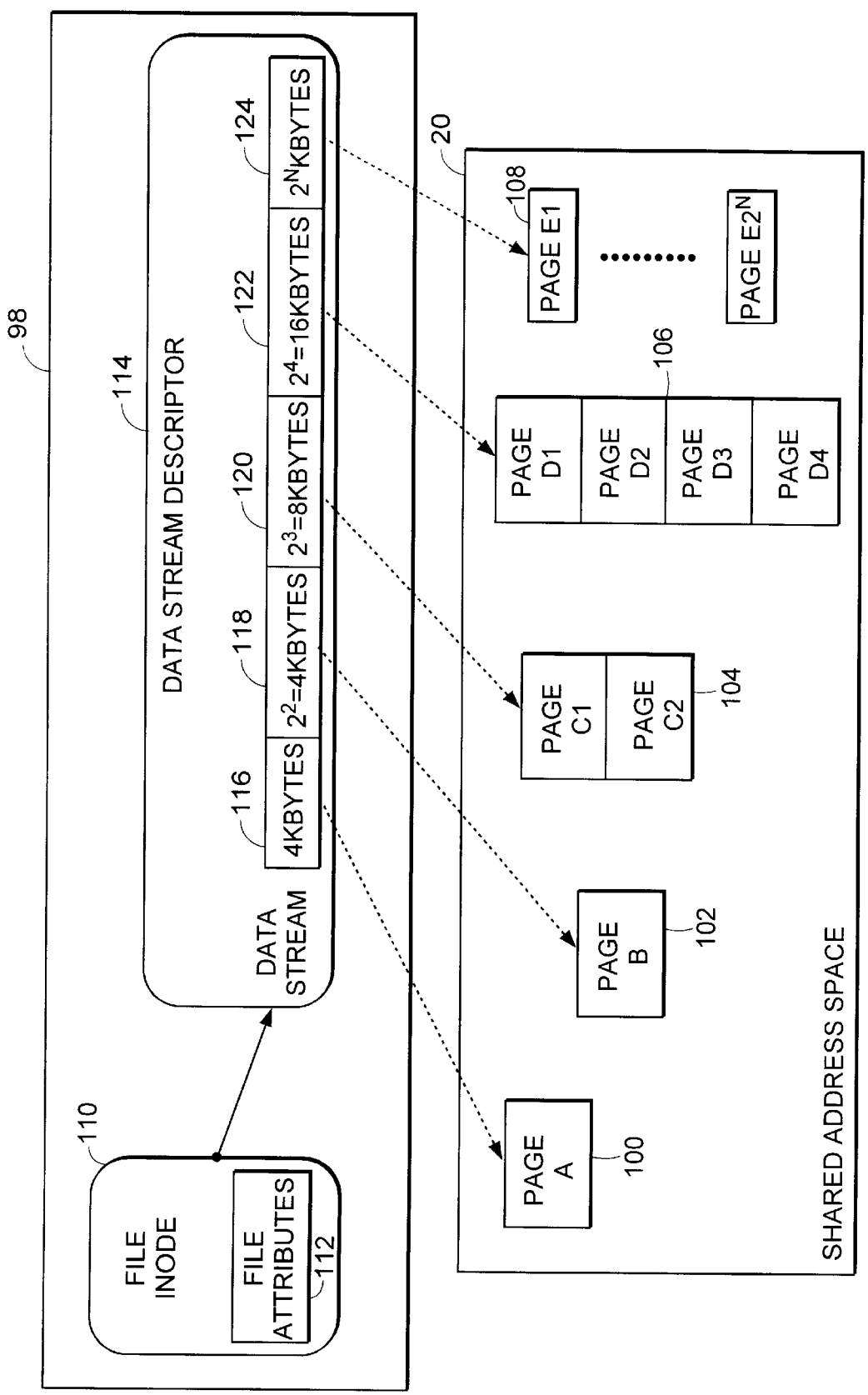
FIG. 5 is a diagram of an Inode suitable for use with the file system of FIG. 3.
Figure 6:
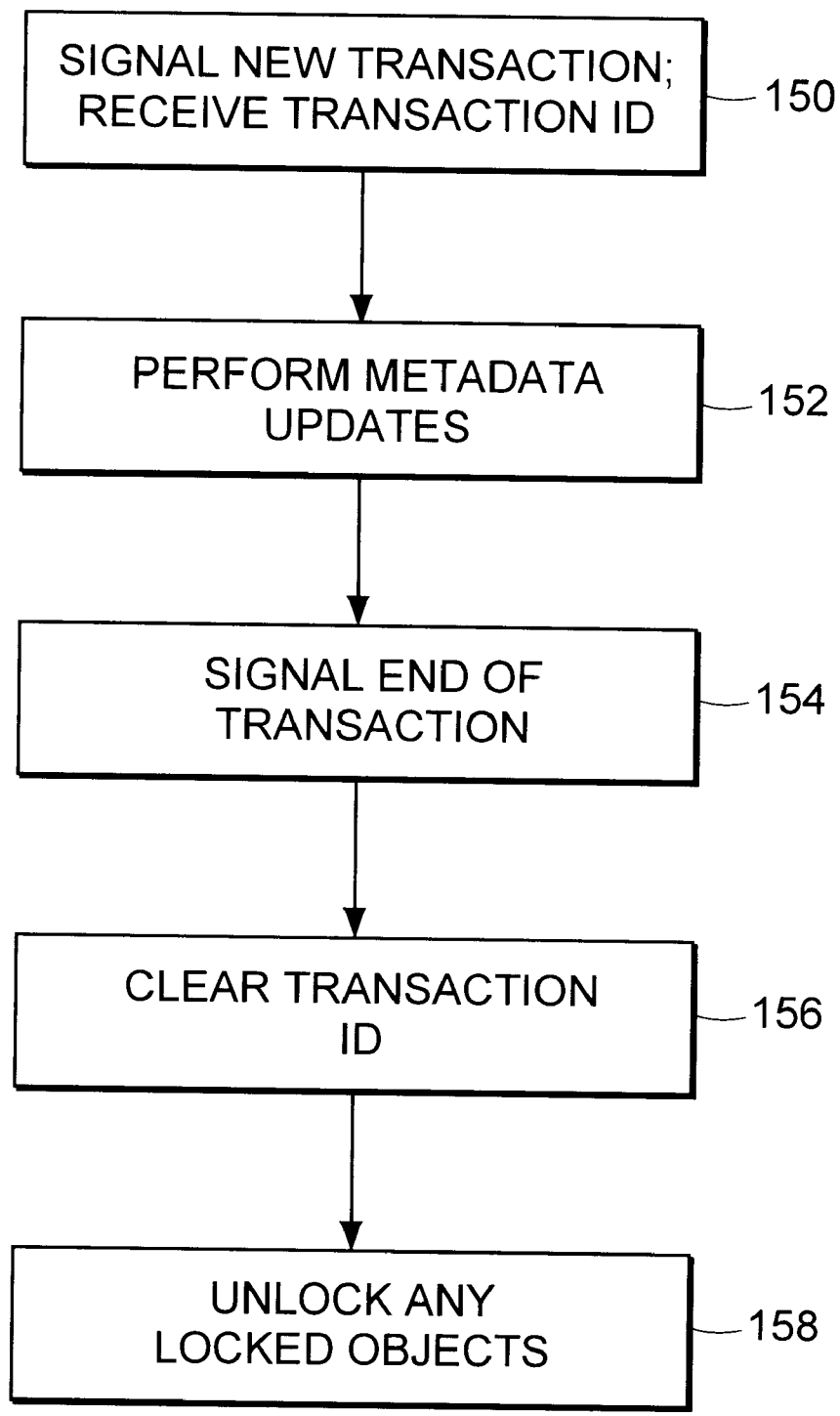
FIG. 6 is a flowchart of the steps to be taken to update file system metadata.

In the embodiment of the file system 60 disclosed in FIG. 5, a file 98 (such as the file 82 of FIG. 3) is represented by one or more shared pages of data 100, 102, 104, 106, and 108 in the addressable shared memory space 20. Each file 98 has a file Inode or descriptor 110 that includes various file attributes 112. The file descriptor 110 contains an address that points to a data stream descriptor 114, and the data stream itself includes one or more addresses 116, 118, 120, 122, and 124 that point to particular pages in the identifiable shared memory space 20. In the disclosed embodiment, a page is the atomic unit in the addressable shared memory space 20, and it contains up to 4 kilobytes of data. Even if the entire 4 kbytes is not needed, an entire page is used. This is illustrated by the page 108 that only contains about 2 kbytes of data. The files used by the file system 60 are described in greater detail below under the heading "Files."

FILESET

The filesets are the basic unit for the file system 60. Each fileset is identified with a name having up to 255 characters. The file system 60 exports a set of fileset level operations that allow an administrator to manage the filesets through the following type of actions.

Fileset Creation

This operation creates a new fileset. The fileset is initially created with one file, the empty root directory. A default fileset is created automatically at the initialization of the addressable shared memory space 20.

Fileset Deletion

This operation deletes a fileset. All files in the fileset are removed, and all shared memory space allocated to the files in the fileset is discarded and the backing physical storage freed for new storage. The file system 60 will only allow deletion of a fileset until there are no open handles to file data stream in the fileset. In order to ready a fileset for deletion, the fileset must be "shutdown" by putting it offline.

Fileset Enumeration

This operation enumerates a specific fileset, or all the filesets, in the addressable shared memory space 20.

Fileset Control

This operation performs fileset level control routines such as setting fileset attributes.

Mount Export Control

Directory are attached to local devices, i.e., "mounted" using parameters stored in the Windows NT registry, or some other similar central storage area for such information. When first started up, the data control program 60 accesses the central storage and determines which filesets should be mounted. The data control program creates a file object representing each fileset identified by the entries in the central storage. In some embodiments an API may be provided which allows the data control program 60 to dynamically mount and unmount filesets by making appropriate API calls.

The users of the file system 60 are not aware of the shared memory "logical volume," but rather view each fileset as a volume (or partition in the sense of a traditional physical file system). The Win32 GetVolumeInformation is used to get information on the fileset (more precisely, on the logical device on which the fileset is attached to). Because all the filesets share the same pool of the storage in the addressable shared memory space 20, the total volume size returned to the user for each fileset is the current aggregate storage capacity in the addressable shared memory space 20. The same approach is taken for the total free space information, and the aggregate value of the addressable shared memory space 20 is returned for each fileset.

DIRECTORY

Directory entry scanning is one of the most frequently performed operations by user applications. It is also may be the most visible operation in terms of performance. Consequently, much attention is directed to making the directory scan efficient and the WindowsNT Files System (NTFS) duplicates sufficient file Inode information in the directory entry such that a read directory operation can be satisfied by scanning and reading the directory entries without going out to read the information from the file Inodes. The problem with this scheme is that the doubly stored file metadata, such as the file time stamps and file size, can be updated quite frequently, making the metadata update more expensive. However, this overhead is considered acceptable in face of the performance gained in directory scan operations.

The file system 60 adopts the same philosophy of providing efficient directory scanning by duplicating file Inode information in directory entries. Each directory entry contains sufficient information to satisfy the Win32 query file information requests. The file Inode is stored with the file stream descriptors on a separate page. The Inode is located via a pointer in the directory entry.

The file system's directory entries are stored in the directory file's directory entry data stream. To maximize space utilization, each directory entry is allocated on the first available free space in a page that can hold the entire entry. The length of the entry varies depending on the length of the file's primary name. The following information is part of the directory entry: creation time; change time; last write time; last accessed time; pointers to stream descriptor; pointer to parent directory Inode; MS-DOS type file attributes; and MS-DOS style file name (8.3 naming convention). For average file name lengths, a page contains up to about 30 entries. All the file information in the directory entry is also contained in the file Inode, except for the file primary name and MS-DOS file name. The file primary names and associated short names are only stored in the directory entries. This makes the Inode size fixed.

When a file information is modified (except for file names), the Inode is updated in the context of the update transaction and therefore always contains the most up-to-date information. The associated directory entry change is lazily flushed to reduce the cost of double updating. This means the Inode updates are either flushed or recoverable, but not the corresponding directory entry updates. If the directory entry gets out of synch with the Inode (when the Inode change is successfully flushed but not the directory change), the entry is updated the next time the Inode is updated. In order to facilitate synchronization of directory updates, the directory entries (Inodes) can not span multiple pages. FIG. 4 illustrates the organization of directory entries and associated Inodes.

FILES

A file of the file system 60 comprises streams of data and the file system metadata to describe the file. Files are described in the file system 60 by objects called Inodes. The Inode is a data structure that stores the file metadata. It represents the file in the file system 60.

A data stream is a logically contiguous stream of bytes. It can be the data stored by applications or the internal information stored by the file system 60. The data streams are mapped onto pages allocated from the addressable shared memory space 20 for storage. The file system 60 segments a data stream into a sequence of 4 kilobyte segments, each segment corresponding to a page. The file system 60 maintains two pieces of size information per data stream: the number of bytes in the data stream; and the allocation size in number of pages. The byte-stream to segment/page mapping information is part of the file metadata and is stored in a structure called data stream descriptor. See FIG. 5.

Users' requests for data are specified in terms of range of bytes and the position of the starting byte measured by its offset from the beginning of the data stream, byte position zero. The file system 60 maps the offset into the page containing the starting byte and the intra-page offset from the beginning of the page.

Every file of the file system 60 has at least two data streams: the default data stream; and the Access Control List (ACL) stream. Each file may optionally have other data streams. The ACL stream is used to store the security Access Control Lists set on the file. Each data stream is individually named so that the user can create or open access to a specific data stream. The name of the default data stream is assumed to be the primary name of the file. To access a data stream, the user of the file system 60 must first open a file handle to the desired data stream by name. Handle to the default data stream handle to the default data stream is opened. This open file handle represents the data stream in all the file system services that operates on the data stream.

The file system 60 exports a set of services to operate at the file level. The input to the services are the file object handle (Inode) or the data stream object handle, and the operation specific parameters, including the desired portions of the data stream in byte positions.

Open files are represented by data stream objects (or just file objects). Users access files using these file objects, identified to the users through file handles. A file handle is a 32-bit entity representing an instance of an open file stream. For example, WindowsNT creates the file object and returns a file handle to the users in response to the user request for file creation or file open. The file system 60 initializes a pointer to a file control block. Multiple file objects point to the same file control block and each file control block maintains separate stream objects for each open context. Externally, the file handle is opaque to the users. Multiple opens can be issued against the same file. When the user closes a file, the file object and the associated file handle is removed.

The file system 60 maps file streams into sequences of segments which become progressively larger, each segment corresponds to one or more pages. The file system 60 attempts to reserve contiguous pages for data streams but only allocates real backing storage on an as needed basis, usually as a result of a file extension requested by writing beyond the data stream allocation size. When a file extension request is received, the file system 60 rounds the extension size in number of bytes up to a multiple of 4 kilobytes to make it an integer number of pages, and requests pages for actual allocation. The number of 4 kilobyte pages allocated by the file system depends on the number of file extension requests made. The file system 60 allocate one 4 kilobyte page for the first extension request, two 4 kilobyte pages for the second request, four 4 kilobyte pages for the third extension request, and so on. The newly allocated pages are zero filled. By reserving contiguous pages, the file system 60 can reduce the amount of bookkeeping information on the byte offset to page mapping. The file system 60 reserves (sometimes much) larger than requested memory space for a file, and substantiates the storage by allocating backing storage page by page.

Four kilobyte allocation segments are chosen to reduce the unused storage space and yet provide a reasonable allocation size for usual file extensions. Since allocation is an expensive operation (most likely involving distributed operations), smaller allocation size is not efficient. Larger allocation size would lead to inefficient space utilization, or additional complexity to manage unused space. A 4 kilobyte segment also maps naturally to a page, simplifying the data stream segment to page mapping. Although an analogy could be made with the NTFS's allocation policy of 4 kilobyte clusters (segment) size for large disks to speed up allocation and reduce fragmentation, such analogy is not completely valid because the actual on-disk allocation segment size depends greatly on the local disk size and the physical file systems.

Similar to the NTFS, which controls the allocation of each disk partition and therefore can quickly determine the free volume space available for allocation, the file system 60 requests the total available space information and uses this information to quickly determine whether to proceed with the allocation processing. If the total available space is less than the required allocation size, the request is denied immediately. Otherwise, the file system 60 will proceed to allocate the pages to satisfy the request. The fact that the file system 60 can proceed with the allocation does not guarantee that the allocation will succeed, because the actual total available space may change constantly.

The file system 60 takes advantage of the page level replication capability of the underlying distributed addressable shared memory system 20 disclosed in the U.S. patent application incorporated by reference above. Page level replication allows the system to provide file replication. The data streams of a replicated file are backed by pages, which are themselves replicated. In this way, data streams are replicated automatically without intervention of the file system 60. The extra space consumed by the multiple replicas is not reflected in the file (data stream) sizes. The stream allocation size still reports the total allocation size in pages required for one replica. The pages backing temporary files, however, are not replicated.

FILE ACCESS AND RESOURCE SHARING— LOCKING

The shared memory provides the distribution mechanism for resource sharing among peer nodes running the file system 60 software. Each instance of the file system 60 on each network node views the shared memory resources (i.e., pages) as being shared with other local or remote threads. The file system 60 needs a way to implement high level, file system locks to provide consistent resource sharing. Any concurrency control structure can be used to implement locks, such as lock objects or semaphores. In database applications, locking may also be achieved by implementing concurrency control structures associated with database indices or keys. In file system applications access to files or directories may be controlled. Another example of file system locks is Byte Range Locking, which provides the users the ability to coordinate shared access to files. A byte range lock is a lock set on a range of bytes of a file. Coordinated shared access to a file can be accomplished by taking locks on the desired byte ranges. In general, the high level file system lock works in the following fashion: (a) a file system resource is to be shared by each file system 60 instance, and the access to the resource is coordinated by a locking protocol using a lock object data structure that represents the high level lock to coordinate the shared resource, and it is the value of the data structure that represents the current state of the lock; (b) to access the resource, the instance at each node must be able to look at the state (or value) of the lock data structure, and if it is "free," modify it so that it becomes "busy," but if it is "busy," then it has to wait to become "free," and there could be intermediate states between "free" and "busy" (i.e., more than two lock states), but in any event, in this byte range locking example, a lock is a description of a certain byte range being shared/exclusively locked by some thread of the file system 60, and a conflicting new byte range lock request that falls in or overlaps the already locked byte range will be denied or the requester may block (depending on how the request was made); and (c) access to or modification of the lock data structure by each node's instance needs to be serialized so that it in turn can then be used to coordinate high level resource sharing.

The locking features and capabilities of the shared memory engine described in the U.S. patent application Ser. No. 08/754,481, incorporated by reference above, allow the file system 60 to coordinate access to pages. The engine can also be used to coordinate access to resources, but in the case of complex high level resource locking such as Byte Range Locking, using the engine's locking features and capabilities directly to provide locks may be too costly for the following reasons: (a) each byte range lock would require a page representing the lock, and since the number of byte range locks can be large, the cost in terms of page consumption may be too high; and (b) the engine locks only provide two lock states (i.e., shared and exclusive), and high level file system locks may require more lock states.

The file system 60 of the invention implements the file system locking using the engine locking as a primitive to provide serialization to access and update the lock data structures. To read a lock structure, the file system 60 takes a shared lock on the data structure's page using the engine locking features and capabilities before it reads the page to prevent the data structure being modified. To modify the lock structure, it sets a exclusive lock on the page. The page lock is taken and released as soon as the lock structure value is read or modified.

With the serialization provided by the page locking and the page invalidation notification, the file system 60 implements the high level locks in the following way: (a) to take a file system lock (FS lock), the file system 60 sets a shared lock on the FS lock page and reads the page and then examines the lock structure; (b) if the lock structure indicates the resource is unlocked or locked in compatible lock mode, then the file system 60 requests to exclusively lock the page, and this guarantees only one file system 60 node instance can modify the lock data structure, and if the request succeeds then the file system 60 write maps the lock page and then changes the lock structure to set the lock and unlocks the page and sets page access to none; and (c) if the resource is locked in incompatible lock mode, the file system 60 unlocks the page but retains the page read mapped, and it then puts itself (the current thread) in a queue and waits for a system event notifying that the lock value has changed, and when the lock value does change then the file system 60 thread gets notified and repeats the step (a) above. The file system 60 implements the notification using a signal primitive. The file system 60 threads waiting for a lock are blocked on a system event. When the page containing the lock changes, a signal is sent to each blocked file system 60 thread. Each blocked file system 60 threads then wakes up and repeats step (a). FS locks are stored in volatile pages.

FILE ACCESS AND RESOURCE SHARING— BYTE RANGE LOCKING

Byte Range Locking is a file system locking service exported to the users through the Win32 LockFile( ) and LockFileEx( ) API. It allows simultaneous access to different non-overlapping regions of a file data stream by multiple users. To access the data stream, the user locks the region (byte range) of the file to gain exclusive or shared read access to the region.

The file system 60 supports byte range locking for each individual data stream of the file. The following Win32-style byte range locking behavior is supported: (a) locking a region of a file is used to acquire shared or exclusive access to the specified region of the file, and the file system 60 will track byte range locks by file handle, therefore file handles provide a way to identify uniquely the owner of the lock; (b) locking a region that goes beyond the current end-of-file position is not an error; (c) locking a portion of a file for exclusive access denies all other processes both read and write access to the specified region of the file, and locking a portion of a file for shared access denies all other processes write access to the specified region of the file but allows other processes to read the locked region, and this means that the file system 60 must check byte range locks set on the data stream not only for lock requests but for every read or write access; (d) if an exclusive lock is requested for a region that is already locked either shared or exclusively by other threads, the request blocks or fails immediately depending on the calling option specified.; and (e) locks may not overlap an existing locked region of the file.

For each byte range lock, the file system 60 creates a byte range lock record to represent the lock. The record contains the following information: (a) byte range; (b) lock mode (shared or exclusive); (c) process identification; and (d) a Win32 lock key value.

The file system 60 regards the file byte ranges as resources with controlled access. For each byte range lock record, the file system 60 creates a file system lock (as discussed above) to coordinate the access to the byte range "resource." A compatible byte range lock request (share lock) translates into taking read lock on the file system lock associated with the byte range record. An exclusive byte range lock request is mapped to taking write lock on the file system lock.

Using the file system locking mechanism discussed above, lock requests waiting on the page containing the desired byte range will be notified when the page content changes.

Having described in some detail a particular embodiment of the invention, namely the file system 60, a brief summary of the disclosure on that file system 60 is now presented in the following three paragraphs.

The file system 60 views the addressable shared memory space 20 as a shared flat identifier space being concurrently accessed by many network nodes (e.g., 12a–12d). The file system 60 maps the file data and metadata logically represented as byte streams in pages, and a page is the unit of the addressable shared memory space 20. From the viewpoint of the file system 60, a data stream is stored in an ordered collection of pages. The file system 60 calls the engine described in the above-identified, incorporated-by-reference U.S. patent application to allocate space in pages from the addressable shared memory space 20 in order to store its metadata and user file data. Sections of the addressable shared memory space 20 that are reserved by the file system 60 can be accessed by an instance of the file system 60 in the addressable shared memory space 20 but not by other types of network nodes.

Each instance of the file system 60 (including the data control programs 32a–34d of FIG. 1) is a peer-of all other network nodes running the file system 60 and thus sharing file data via the addressable shared memory space 20. To the local users, the file system 60 exhibits the characteristics of single node consistency, and file sharing behaves as if sharing with other processes on the same node. From a file system 60 user's viewpoint, the following local behavior is observed: (a) file data update is consistent in the entire network, i.e., if a file page is changed, the modification is seen immediately by other users with open handles to the file, and for shared write file access, the coordination of the shared write access, if any, rests entirely with the users, usually by means of byte range locking; and (b) flush is a global operation in the network, i.e., a valid dirty file page can be flushed from any node that has the file open, and if the flush is not successfully completed, the resulting file data state could be either the old state before the flush or a partially written state, and the file system 60 instances utilize the shared address space both as data storage and as mechanism for information passing (locking and information sharing).

The following is a list of the types of requests the file system 60 can issue to underlying engine disclosed in the above-identified, incorporated-by-reference U.S. patent application: (a) reserve a chunk of the addressable shared memory space 20—the file system 60 requests a contiguous range of addresses to be reserved, and the reservation of shared memory space does not cause the materialization (allocation) of the memory space but instead it merely reserves the space represented by the addresses; (b) unreserve a chunk of addresses in the addressable shared memory space 20—the file system 60 frees a range of addresses that is no longer used, and there is no unreserve call since addresses are not re-used once discarded; (c) materialize a chunk of the addressable shared memory space 20—allocate shared memory space for previously reserved addresses, and the allocated space is returned as pages, but only after reserved shared memory space is allocated that it can be accessed by the file system 60, and allocated pages are accessible but to access them the file system 60 has to make formal access requests and the file system 60 must specify whether the pages being allocated are persistent or volatile, and also the file system 60 can optionally specify the number of replicas required for the pages; (d) deallocate pages—a number of pages is freed by the file system 60, and the resources represented by the pages can be recycled; (e) access range of pages—the file system 60 requests read or write access to pages, and this will cause the page to be brought to the local node memory; (f) unreference a range of pages—the file system 60 indicates that it no longer needs to access the pages; (g) lock and unlock a page—the file system 60 uses the lock and unlock page to synchronize read-write updates to a page, and the lock semantic "shared, exclusive" is used; (h) flush dirty pages—the file system 60 requests a flush of dirty pages to persistent storage, and the flush is typically carried out when explicitly requested by the file system's callers when file is closed or during a file system shutdown; (i) set attributes on pages and subpages—the file system 60 uses the page attributes to specify the desired page management behavior, and some of the attributes set by the file system include the best coherency protocol for the page, how the pages should be replicated (number of core copies), whether the pages should be cached in the RAM cache, set a 16-byte file system attribute on the page; (j) read (get) attributes of a page; (k) get the location of the super_root; (1) get the total storage space (in bytes) and the total free storage space (in bytes) of the addressable shared memory space 20; and (m) transaction logging operations such as transaction begin, end, commit, abort, get log records, etc.

Addressable Shared Memory Space

Heaving described the invention and various embodiments thereof in some detail, a more detailed description is now provided of the addressable shared memory space that is disclosed in the commonly-owned U.S. patent application Ser. No. 08/754,481 filed Nov. 22, 1996, and incorporated by reference above. All of the information provided below is contained in that patent application.

The addressable shared memory system disclosed in the U.S. patent application incorporated by reference is an "engine" that can create and manage a virtual memory space that can be shared by each computer on a network and can span the storage space of each memory device connected to the network. Accordingly, all data stored on the network can be stored within the virtual memory space and the actual physical location of the data can be in any of the memory devices connected to the network.

More specifically, the engine or system can create or receive, a global address signal that represents a portion, for example 4 k bytes, of the virtual memory space. The global address signal can be decoupled from, i.e., unrelated to, the physical and identifier spaces of the underlying computer hardware, to provide support for a memory space large enough to span each volatile and persistent memory device connected to the system. For example, systems of the invention can operate on 32-bit computers, but can employ global address signals that can be 128 bits wide. Accordingly, the virtual memory space spans $2^{128}$ bytes, which is much larger than the $2^{32}$ address space supported by the underlying computer hardware. Such an address space can be large enough to provide a separate address for every byte of data storage on the network, including all RAM, disk and tape storage.

For such a large virtual memory space, typically only a small portion is storing data at any time. Accordingly, the system includes a directory manager that tracks those portions of the virtual memory space that are in use. The system provides physical memory storage for each portion of the virtual memory space in use by mapping each such portion to a physical memory device, such as a RAM memory or a hard-drive. Optionally, the mapping includes a level of indirection that facilitates data migration, fault-tolerant operation, and load balancing.

By allowing each computer to monitor and track which portions of the virtual memory space are in use, each computer can share the memory space. This allows the networked computers to appear to have a single memory, and therefore can allow application programs running on different computers to communicate using techniques currently employed to communicate between applications running on the same machine.

In one aspect, the invention of the above-identified, incorporated-by-reference U.S. patent application can be understood to include computer systems having a addressable shared memory space. The systems can comprise a data network that carries data signals representative of computer readable information a persistent memory device that couples to the data network and that provides persistent data storage, and plural computers that each have an interface that couples to the data network, for accessing the data network to exchange data signals therewith. Moreover, each of the computers can include a shared memory subsystem for mapping a portion of the addressable memory space to a portion of the persistent storage to provide addressable persistent storage for data signals.

In a system that distributes the storage across the memory devices of the network, the persistent memory device will be understood to include a plurality of local persistent memory devices that each couple to a respective one of the plural computers. To this same end, the system can also include a distributor for mapping portions of the addressable memory space across the plurality of local persistent memory devices and a disk directory manager for tracking the mapped portions of the addressable memory space to provide information representative of the local persistent memory device that stores that portion of the addressable memory space mapped thereon.

The systems can also include a cache system for operating one of the local persistent memory devices as a cache memory for cache storing data signals associated with recently accessed portions of the addressable memory space. Further the system can include a migration controller for selectively moving portions of the addressable memory space between the local persistent memory devices of the plural computers. The migration controller can determine and respond to data access patterns, resource demands or any other criteria or heuristic suitable for practice with the invention. Accordingly, the migration controller can balance the loads on the network, and move data to nodes from which it is commonly accessed. The cache controller can be a software program running on a host computer to provide a software managed RAM and disk cache. The RAM can be any volatile memory including SRAM, DRAM or any other volatile memory. The disk can be any persistent memory including any disk, RAID, tape or other device that provides persistent data storage.

The systems can also include a coherent replication controller for generating a copy, or select number of copies, of a portion of the addressable memory space maintained in the local persistent memory device of a first computer and for storing the copy in the local persistent memory device of a second computer. The coherent replication controller can maintain the coherency of the copies to provide coherent data replication.

The systems can also be understood to provide integrated control of data stored in volatile memory and in persistent memory. In such systems a volatile memory device has volatile storage for data signals, and the shared memory subsystem includes an element, typically a software module, for mapping a portion of the addressable memory space to a portion of the volatile storage. In these systems the volatile memory device can be comprised of a plurality of local volatile memory devices each coupled to a respective one of the plural computers, and the persistent memory device can be comprised of a plurality of local persistent memory devices each coupled to a respective one of the plural computers.

In these systems, a directory manager can track the mapped portions of the addressable memory space, and can include two sub-components; a disk directory manager for tracking portions of the addressable memory space mapped to the local persistent memory devices, and a RAM directory manager for tracking portions of the addressable memory space mapped to the local volatile memory devices. Optionally, a RAM cache system can operate one of the local volatile memory devices as a cache memory for cache storing data signals associated with recently accessed portions of the addressable memory space.

The systems can include additional elements including a paging element for remapping a portion of the addressable memory space between one of the local volatile memory devices and one of the local persistent memory devices; a policy controller for determining a resource available signal representative of storage available on each of the plural computers and, a paging element that remaps the portion of addressable memory space from a memory device of a first computer to a memory device of a second computer, responsive to the resource available signal; and a migration controller for moving portions of addressable memory space between the local volatile memory devices of the plural computers.

Optionally, the systems can include a hierarchy manager for organizing the plural computers into a set of hierarchical groups wherein each group includes at least one of the plural computers. Each the group can include a group memory manager for migrating portions of addressable memory space as a function of the hierarchical groups.

The system can maintain coherency between copied portions of the memory space by including a coherent replication controller for generating a coherent copy of a portion of addressable memory space.

The system can generate or receive global address signals. Accordingly the systems can include an address generator for generating a global address signal representative of a portion of addressable memory space. The address generator can include a spanning unit for generating global address signals as a function of a storage capacity associated with the persistent memory devices, to provide global address signals capable of logically addressing the storage capacity of the persistent memory devices.

In distributed systems, the directory manager can be a distributed directory manager for storing within the distributed memory space, a directory signal representative of a storage location of a portion of the addressable memory space. The distributed directory manager can include a directory page generator for allocating a portion of the addressable memory space and for storing therein an entry signal representative of a portion of the directory signal. The directory page generator optionally includes a range generator for generating a range signal representative of a portion of the addressable memory space, and for generating the entry signal responsive to the range signal, to provide an entry signal representative of a portion of the directory signal that corresponds to the portion of the addressable memory space. Moreover, the distributed directory manager can include a linking system for linking the directory pages to form a hierarchical data structure of the linked directory pages as well as a range linking system for linking the directory pages, as a function of the range signal, to form a hierarchical data structure of linked directory pages.

As the data stored by the system can be homeless, in that the data has no fixed physical home, but can migrate, as resources and other factors dictate, between the memory devices of the network, a computer system according to the invention can include a directory page generator that has a node selector for generating a responsible node signal representative of a select one of the plural computers having location information for a portion of the shared address space. This provides a level of indirection that decouples the directory from the physical storage location of the data. Accordingly, the directory needs only to identify the node, or other device, that tracks the physical location of the data. This way, each time data migrates between physical storage locations, the directory does not have to be updated, since the node tracking the location of the data has not changed and still provides the physical location information.

Accordingly, the system can include page generators that generate directory pages that carry information representative of a location monitor, such as a responsible computer node, that tracks a data storage location, to provide a directory structure for tracking homeless data. Moreover, the directory itself can be stored as pages within the virtual memory space. Therefore, the data storage location can store information representative of a directory page, to store the directory structure as pages of homeless data.

In another aspect, the invention of the above-identified, incorporated-by-reference U.S. patent application can be understood as methods for providing a computer system having a addressable shared memory space. The method can include the steps of providing a network for carrying data signals representative of computer readable information, providing a hard-disk, coupled to the network, and having persistent storage for data signals, providing plural computers, each having an interface, coupled to the data network, for exchanging data signals between the plural computers, and assigning a portion of the addressable memory space to a portion of the persistent storage of the hard disk to provide addressable persistent storage for data signals.

Figure 7:
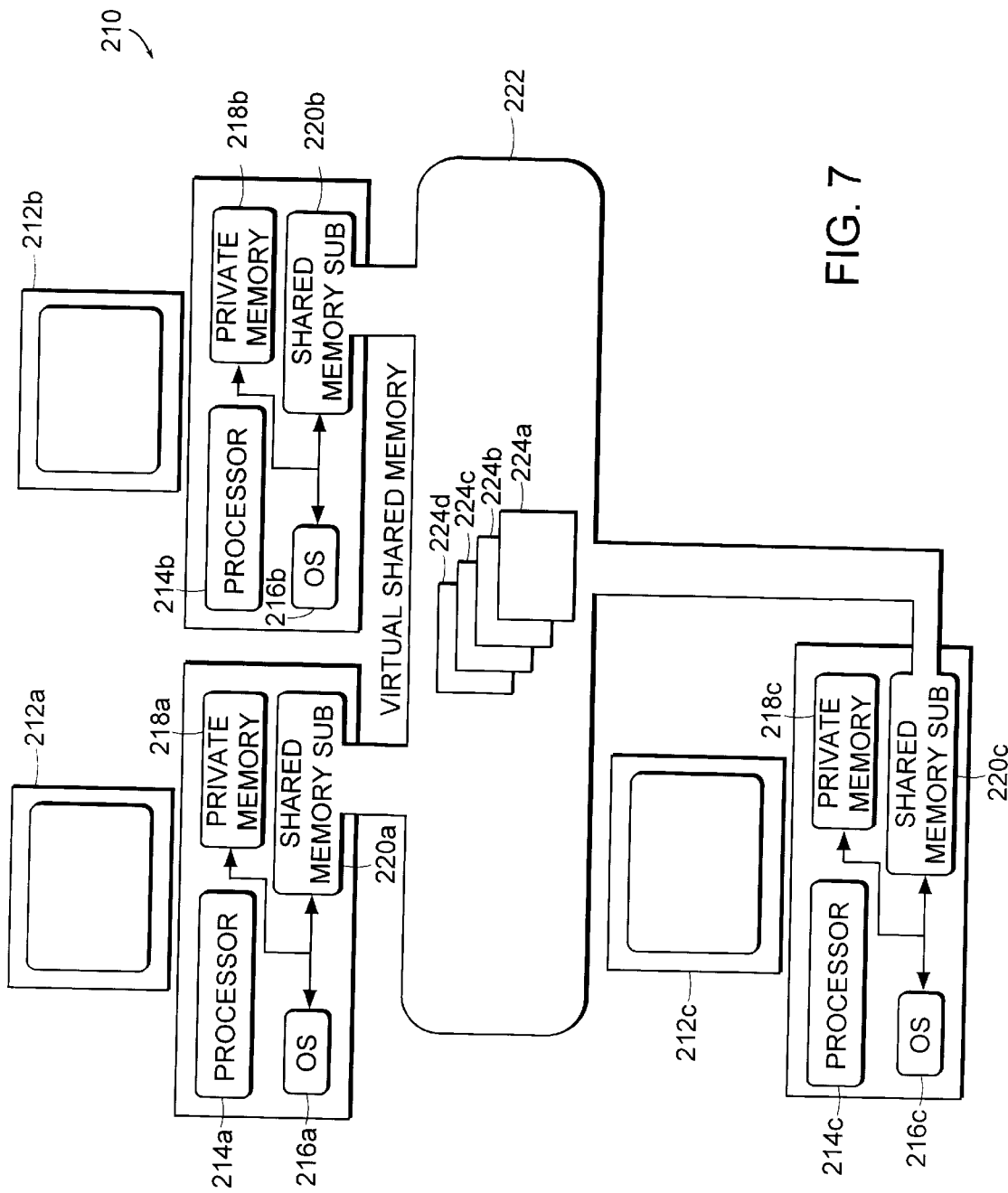
FIG. 7 illustrates a distributed shared memory computer network.

Turning now to the drawings related to the addressable shared memory system or engine of the above-identified, incorporated-by-reference U.S. patent application, FIG. 7 illustrates a computer network 10 that provides a shared memory that spans the memory space of each node of the depicted computer network 210.

Specifically, FIG. 7 illustrates a computer network 210 that includes a plurality of nodes 212a–212c, each having a CPU 214, an operating system 216, an optional private memory device 218, and a shared memory subsystem 220. As further depicted in by FIG. 5, each node 212a–212c connects via the shared memory subsystem 220 to a virtual shared memory 222. As will be explained in greater detail hereinafter, by providing the shared memory subsystem 220 that allows the node 212a–212c to access the virtual shared memory 222, the computer network 210 enables network nodes 212a–212c to communicate and share functionality using the same techniques employed by applications when communicating between applications running on the same machine. These techniques can employ object linking and embedding, dynamic link libraries, class registering, and other such techniques. Accordingly, the nodes 212 can employ the virtual shared memory 222 to exchange data and objects between application programs running on the different nodes 212 of the network 210.

In the embodiment depicted in FIG. 7, each node 212 can be a conventional computer system such as a commercially available IBM PC compatible computer system. The processor 214 can be any processor unit suitable for performing the data processing for that computer system. The operating system 216 can be any commercially available or proprietary operating system that includes, or can access, functions for accessing the local memory of the computer system and networking.

The private memory device 218 can be any computer memory device suitable for storing data signals representative of computer readable information. The private memory provides the node with local storage that can be kept inaccessible to the other nodes on the network. Typically the private memory device 218 includes a RAM, or a portion of a RAM memory, for temporarily storing data and application programs and for providing the processor 214 with memory storage for executing programs. The private memory device 18 can also include persistent memory storage, typically a hard disk unit or a portion of a hard disk unit, for the persistent storage of data.

The shared memory subsystem 220 depicted in FIG. 7 is an embodiment of the invention that couples between the operating system 216 and the virtual shared memory 222 and forms an interface between the operating system 216 and the virtual shared memory to allow the operating system 216 to access the virtual shared memory 222. The depicted shared memory subsystem 220 is a software module that operates as a stand-alone distributed shared memory engine. The depicted system is illustrative and other systems of the invention can be realized as shared memory subsystems that can be embedded into an application program, or be implemented as an embedded code of a hardware device. Other such applications can be practiced without departing from the scope of the invention.

The depicted virtual shared memory 222 illustrates a virtual shared memory that is accessible by each of the nodes 212a–212c via the shared memory subsystem 220. The virtual shared memory 222 can map to devices that provide physical storage for computer readable data, depicted in FIG. 7 as a plurality of pages 224a–224d. In one embodiment, the pages form portions of the shared memory space and divide the address space of the shared memory into page addressable memory spaces. For example the address space can be paged into 4K byte sections. In other embodiments alternative granularity can be employed to manager the shared memory space. Each node 212a–212c through the shared memory subsystem 220 can access each page 224a–224d stored in the virtual shared memory 222. Each page 224a–224d represents a unique entry of computer data stored within the virtual shared memory 222. Each page 224a–224d is accessible to each one of the nodes 212a–212c, and alternatively, each node can store additional pages of data within the virtual shared memory 222. Each newly stored page of data can be accessible to each of the other nodes 212a–212c. Accordingly, the virtual shared memory 222 provides a system for sharing and communicating data between each node 212 of the computer network 210.

Figure 8:
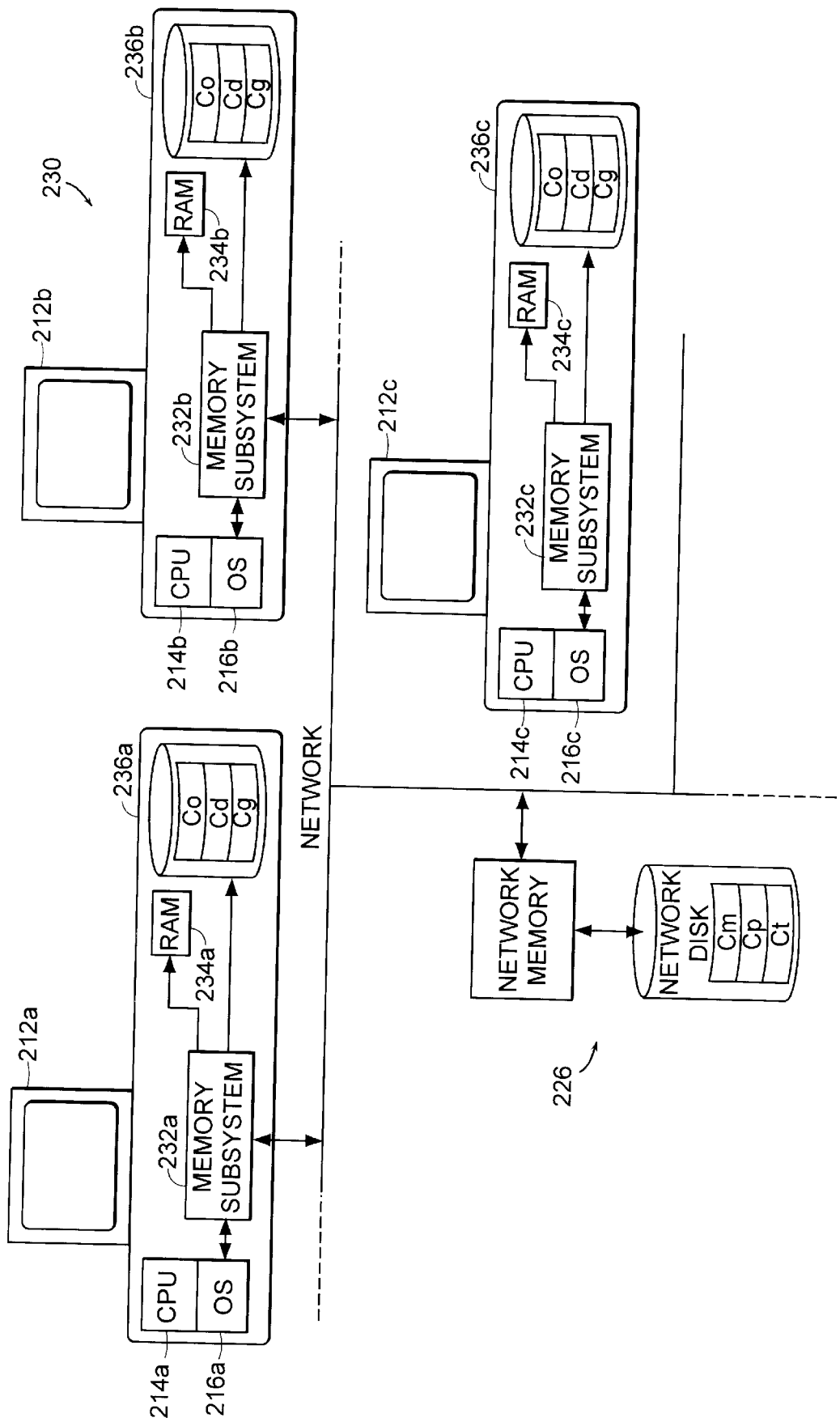
FIG. 8 is a functional block diagram that illustrates in more detail one distributed shared memory computer network of the type shown in FIG. 7.

FIG. 8 illustrates in functional block diagram form a computer network 230 that has a distributed shared memory. In this embodiment, each node 212a–212c has a memory subsystem 232 that connects between the operating system 216 and the two local memory devices, the RAM 234 and the disk 236, and that further couples to a network 238 that couples to each of the depicted nodes 212a, 212b and 212c and to a network memory device 226.

More particularly, FIG. 8 illustrates a distributed shared memory network 30 that includes a plurality of nodes 212a–212c, each including a processing unit 214, an operating system 216, a memory subsystem 232, a RAM 234, and a disk 236. FIG. 8 further depicts a computer network system 38 that connects between the nodes 212a–212c and the network memory device 226. The network 238 provides a network communication system across these elements.

The illustrated memory subsystems 232a–232c that connect between the operating system 216a–216c, the memory elements 234a–234c, 236a–236c, and the network 238, encapsulate the local memories of each of the nodes to provide an abstraction of a shared virtual memory system that spans across each of the nodes 212a–212c on the network 238. The memory subsystems 232a–232c can be software modules that act as distributors to map portions of the addressable memory space across the depicted memory devices. The memory subsystems further track the data stored in the local memory of each node 212 and further operate network connections with network 238 for transferring data between the nodes 212a–212c. In this way, the memory subsystems 232a–232caccess and control each memory element on the network 238 to perform memory access operations that are transparent to the operating system 216. Accordingly, the operating system 216 interfaces with the memory subsystem 232 as an interface to a global memory space that spans each node 212a–212con the network 238.

FIG. 8 further depicts that the system 230 provides a distributed shared memory that includes persistent storage for portions of the distributed memory. In particular, the depicted embodiment includes a memory subsystem, such as subsystem 232a, that interfaces to a persistent memory device, depicted as the disk 236a. The subsystem 232a can operate the persistent memory device to provide persistent storage for portions of the distributed shared memory space. As illustrated, each persistent memory device 236 depicted in FIG. 8 has a portion of the addressable memory space mapped onto it. For example, device 236a has the portions of the addressable memory space, $C_o$, $C_d$, $C_g$, mapped onto it, and provides persistent storage for data signals stored in those ranges of addresses.

Accordingly, the subsystem 232a can provide integrated control of persistent storage devices and electronic memory to allow the distributed shared memory space to span across both types of storage devices, and to allow portions of the distributed shared memory to move between persistent and electronic memory depending on predetermined conditions, such as recent usage.

Referring to the embodiment depicted in FIG. 2, the nodes of the network may be organized into a hierarchy of groups. In these embodiments, the memory subsystems 232a–232c can include a hierarchy manager that provides hierarchical control for the distribution of data. This includes controlling the migration controller, and policy controller, which are discussed in detail below, to perform hierarchical data migration and load balancing, such that data migrates primarily between computers of the same group, and passes to other groups in hierarchical order. Resource distribution is similarly managed.

Figure 9:
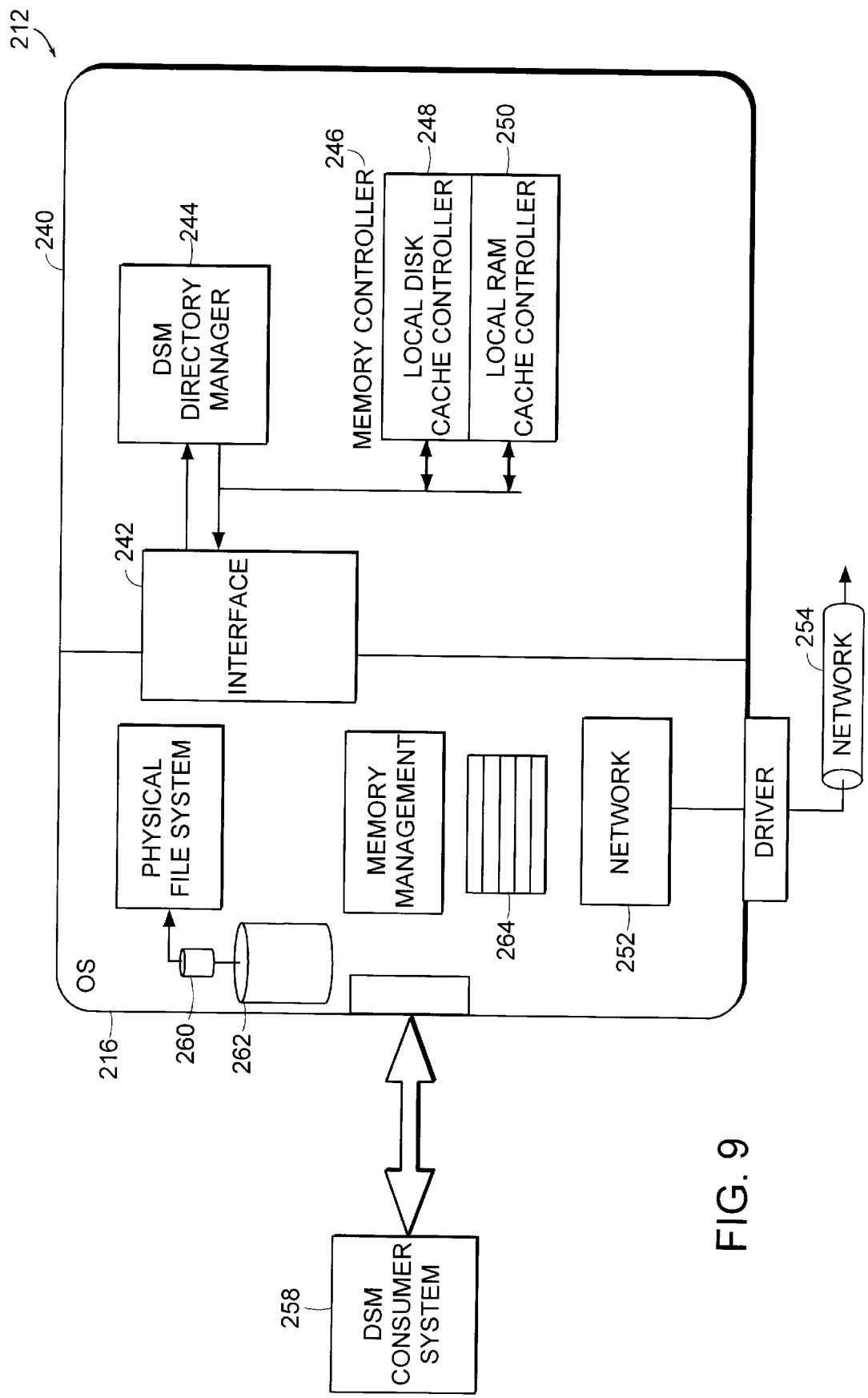
FIG. 9 illustrates in more detail a shared memory subsystem suitable for practice with the network illustrated in FIG. 8.

FIG. 9 illustrates in more detail one shared memory subsystem 240 according to the invention. FIG. 9 depicts a shared memory subsystem 240, that includes an interface 242, a DSM directory manager 244, a memory controller 246, a local disk cache controller 248, and a local RAM cache controller 250. FIG. 9 further depicts the network 254, an optional consumer of the DSM system, depicted as the service 258, the operating system 216, a disk driver 260, a disk element 262 and a RAM element 264.

The shared memory subsystem 240 depicted in FIG. 9 can encapsulate the memory management operations of the network node 212 to provide a virtual shared memory that can span across each node that connects into the network 254. Accordingly, each local node 212 views the network as a set of nodes that are each connected to a large shared computer memory.

The depicted interface 242 provides an entry point for the local node to access the shared memory space of the computer network. The interface 242 can couple directly to the operating system 216, to a distributed service utility such as the depicted DSM file system 258, to a distributed user-level service utility, or alternatively to any combination thereof The depicted interface 242 provides an API that is a memory oriented API. Thus, the illustrated interface 242 can export a set of interfaces that provide low-level control of the distributed memory. As illustrated in FIG. 9, the interface 242 exports the API to the operating system 216 or to the optional DSM service 258. The operating system 216 or the service employs the interface 242 to request standard memory management techniques, such as reading and writing from portions of the memory space. These portions of the memory space can be the pages as described above which can be 4 K byte portions of the shared memory space, or other units of memory, such as objects or segments. Each page can be located within the shared memory space which is designated by a global address signal for that page of memory. The system can receive address signals from an application program or, optionally, can include a global address generator that generates the address signals. The address generator can include a spanning module that generates address signals for a memory space that spans the storage capacity of the network.

Accordingly, in one embodiment, the interface 242 receives requests to manipulate pages of the shared memory space. To this end, the interface 242 can comprise a software module that includes a library of functions that can be called by services, the OS 216, or other caller, or device. The function calls provide the OS 216 with an API of high level memory oriented services, such as read data, write data, and allocate memory. The implementation of the functions can include a set of calls to controls that operate the directory manager 244, and the local memory controller 246. Accordingly, the interface 242 can be a set of high level memory function calls to interface to the low-level functional elements of shared memory subsystem 240.

FIG. 9 further depicts a DSM directory manager 244 that couples to the interface 242. The interface 242 passes request signals that represent requests to implement memory operations such as allocating a portion of memory, locking a portion of memory, mapping a portion of memory, or some other such memory function. The directory manager 244 manages a directory that can include mappings than can span across each memory device connected to the network 238 depicted in FIG. 8, including each RAM and disk element accessible by the network. The directory manager 244 stores a global directory structure that provides a map of the global address space. In one embodiment as will be explained in greater detail hereinafter, the directory manager 244 provides a global directory that maps between global address signals and responsible nodes on the network. A responsible node stores information regarding the location and attributes of data associated with a respective global address, and optionally stores a copy of that page's data. Consequently, the directory manager 244 tracks information for accessing any address location within the identifier space.

The control of the distributed shared memory can be coordinated by the directory manager 244 and the memory controller 246. The directory manager 244 maintains a directory structure that can operate on a global address received from the interface 242 and identify, for that address, a node on the network that is responsible for maintaining the page associated with that address of the shared memory space. Once the directory manager 244 identifies which node is responsible for maintaining a particular address, the directory manager 244 can identify a node that stores information for locating a copy of the page, and make the call to the memory controller 246 of that node and pass to that node's memory controller the memory request provided by the memory interface 242. Accordingly, the depicted directory manager 244 is responsible for managing a directory structure that identifies for each page of the shared memory space a responsible node that tracks the physical location of the data stored in the respective page. Thus, the directory, rather than directly providing the location of the page, can optionally identify a responsible node, or other device, that tracks the location of the page. This indirection facilitates maintenance of the directory as pages migrate between nodes.

The memory controller 246 performs the low level memory access functions that physically store data within the memory elements connected to the network. In the depicted embodiment, the directory manager 244 of a first node can pass a memory access request through the interface 242, to the network module of the OS 216, and across the network 254 to a second node that the directory manager 244 identifies as the responsible node for the given address. The directory manager 244 can then query the responsible node to determine the attributes and the current owner node of the memory page that is associated with the respective global address. The owner of the respective page is the network node that has control over the memory storage element on which the data of the associated page is stored. The memory controller 246 of the owner can access, through the OS 216 of that node or through any interface, the memory of the owner node to access the data of the page that is physically stored on that owner node.

In particular, as depicted in FIG. 9, the directory manager 244 couples to the network module 252 which couples to the network 254. The directory manager can transmit to the network module 252 a command and associated data that directs the network interface 252 to pass a data signal to the owner node. The owner node receives the memory request across network 254 and through network module 252 that passes the memory request to the interface 242 of that owner node. The interface 242 couples to the memory controller 246 and can pass the memory request to the local memory controller of that owner node for operating the local storage elements, such as the disk or RAM elements, to perform the requested memory operation.

Once the owner node has performed the requested memory operation, such as reading a page of data, the memory subsystem 240 of the owner node can then transfer the page of data, or a copy of the page of data, via the network 254 to the node that originally requested access to that portion of the shared memory. The page of data is transferred via the network 254 to the network module 252 of the requesting node and the shared memory subsystem 240 operates the memory controller 246 to store in the local memory of the requesting node a copy of the accessed data.

Accordingly, in one embodiment of the invention, when a first node accesses a page of the shared memory space which is not stored locally on that node, the directory manager 244 identifies a node that has a copy of the data stored in that page and moves a copy of that data into the local memory of the requesting node. The local memory storage, both volatile (e.g. local RAM) and persistent (e.g. local disk storage), of the requesting node therefore becomes a cache for pages that have been requested by that local node. This embodiment is depicted FIG. 9 which depicts a memory controller that has a local disk cache controller 248 and a local RAM cache controller 250. Both of these local cache controllers can provide to the operating system 216, or other consumer pages of the shared memory space that are cache stored in the local memory of the node, including local persistent memory and local volatile memory.

The shared memory subsystem can include a coherent replication controller that maintains coherency between cached pages by employing a coherence through invalidation process, a coherence through migration process or other coherence process suitable for practice with the present invention. The coherent replication controller can automatically generate a copy of the data stored in each page and can store the copy in a memory device that is separate from the memory device of the original copy. This provides for fault tolerant operation, as the failure of any one memory device will not result in the loss of data. The coherent replication controller can be a software model that monitors all copies of pages kept in volatile memory and made available for writing. The controller can employ any of the coherency techniques named above, and can store tables of location information that identifies the location information for all generated copies.

Figure 10:
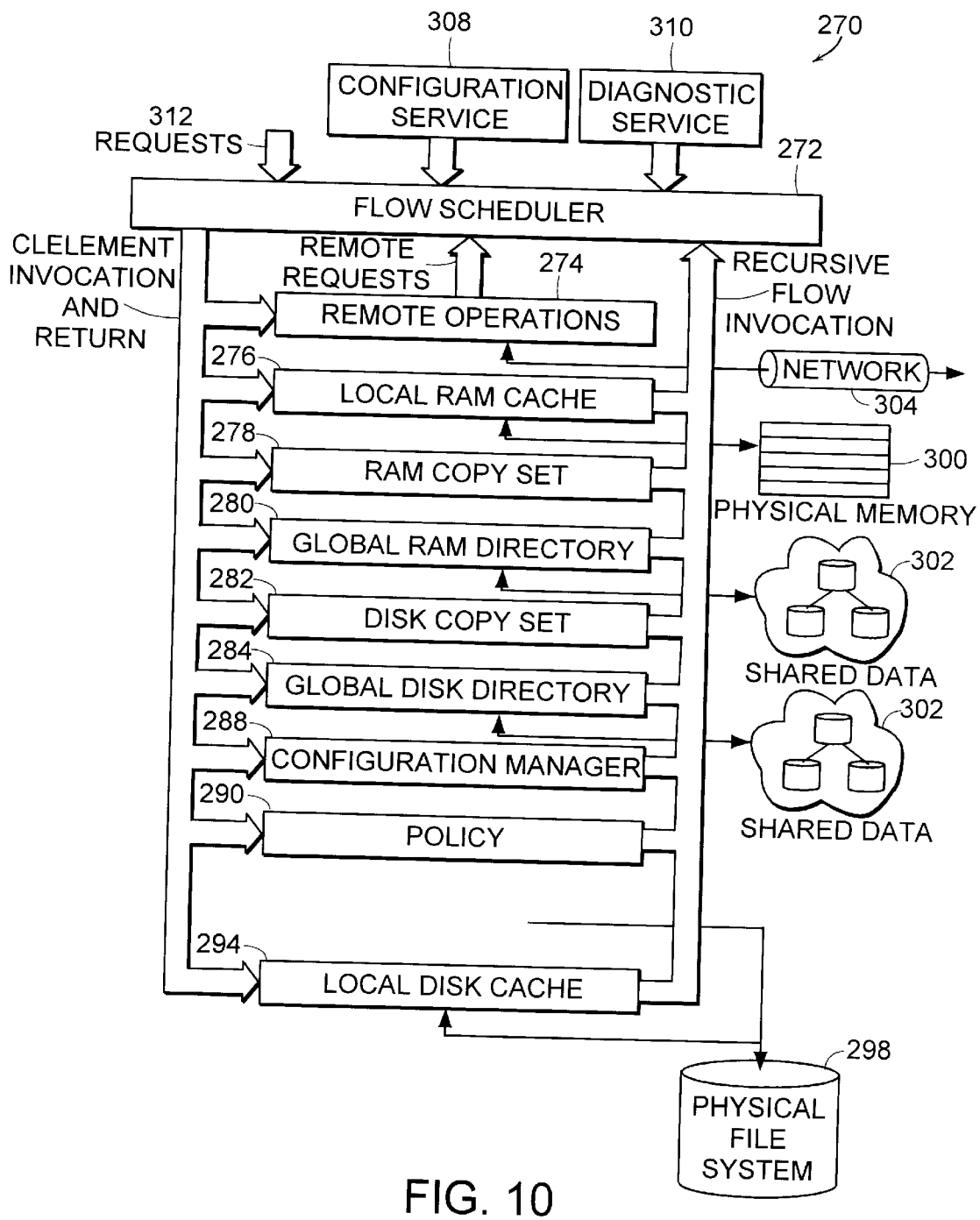
FIG. 10 is a functional block diagram of one shared memory subsystem according to the invention.

FIG. 10 illustrates in greater detail one embodiment of a shared memory subsystem according to the invention. The shared memory subsystem 270 depicted in FIG. 10 includes a remote operations element 274, a local RAM cache 276, a RAM copyset 278, a global RAM directory 280, a disk copyset 282, a global disk directory 284, a configuration manager 288, a policy element 290, and a local disk cache 94. FIG. 10 further depicts a network element 304, a physical memory 300, shared data element 302, a physical file system 298, which is part of the operating system 216, a configuration service 308, a diagnostic service 310, and a memory access request 312. The depicted subsystem 270 can be a computer program that couples to the physical memory, file system, and network system of the host node, or can be electrical circuit card assemblies that interface to the host node, or can be a combination of programs and circuit card assemblies.

The flow scheduler 272 depicted in FIG. 10 can orchestrate the controls provided by an API of the subsystem 270. In one embodiment, the flow scheduler 272 can be a state machine that monitors and responds to the requests 312 and remote requests through network 304 which can be instructions for memory operations and which can include signals representative of the global addresses being operated on. These memory operation requests 312 can act as op-codes for primitive operations on one or more global addresses. They can be read and write requests, or other memory operations. Alternatively, the flow scheduler 272 can be a program, such as an interpreter, that provides an execution environment and can map these op-codes into control flow programs called applets. The applets can be independent executable programs that employ both environment services, such as threading, synchronization, and buffer management, and the elements depicted in FIG. 10. The API is capable of being called from both external clients, like a distributed shared memory file system, as well as recursively by the applets and the other elements 274–294 of the subsystem 270. Each element can provide a level of encapsulation to the management of a particular resource or aspect of the system. To this end, each element can export an API consisting of functions to be employed by the applets. This structure is illustrated in FIG. 10. Accordingly, the flow scheduler 272 can provide an environment to load and execute applets. The applets are dispatched by the flow scheduler 272 on a per op-code basis and can perform the control flow for sequential or parallel execution of an element to implement the op-code on the specified global address, such as a read or write operation. Optionally, the flow scheduler 272 can include an element to change dynamically the applet at run time as well as execute applets in parallel and in interpreted mode.

The depicted shared memory subsystem 270 includes a bifurcated directory manager that includes the global RAM directory 280 and the global disk directory 284. The global RAM directory 280 is a directory manager that tracks information that can provide the location of pages that are stored in the volatile memory, typically RAM, of the network nodes. The global disk directory 284 is a global disk directory manager that manages a directory structure that tracks information that can provide the location of pages that are stored on persistent memory devices. Together, the global RAM directory 280 and the global disk directory 284 provide the shared memory subsystem 270 with integrated directory management for pages that are stored in persistent storage and volatile memory.

In one embodiment a paging element can operate the RAM and disk directory managers to remap portions of the addressable memory space between one of the volatile memories and one of the persistent memories. In the shared memory system, this allows the paging element to remap pages from the volatile memory of one node to a disk memory of another node. Accordingly, the RAM directory manager passes control of that page to the disk directory manager which can then treat the page as any other page of data. This allows for improved load balancing, by removing data from RAM memory, and storing it in the disk devices, under the control of the disk directory manager.

Data may be stored in the Ram memory of more than one node, the persistent memory of more than one node, or some combination of RAM and persistent memory distributed throughout the network. This natural distribution of data present in the system provides a first line of defense against node failures. In addition to the natural distribution of data, the system may "duplex" pages of data, i.e., the system may store copies on pages or multiple nodes. The global disk directory 284 maps address ranges to nodes that are responsible for managing the pages within each range. The nodes responsible for a range of addresses will be referred to as the "core holders" of those pages.

Each page can be assigned a minimum number of core holders below which it should not fall. For example, if a page is assigned three as the minimum number of core holders and the third core holder suffers a failure which prevents access to the page, the page has fallen below if preferred minimum number of core holders and another copy of the page should be made. Another copy of the page may be made on the core holder node (if it did not completely fail), or a new core holder may be appointed a copy of the page given to it by one of the surviving core holders.

As alluded to above, reduplexing is also used to recover from complete node, and reduplexing after a node failure will be discussed in greater detail below.

The local memory controller of the subsystem 270 is provided by the local RAM cache 276 and the local disk cache 294. The local RAM cache 276 which couples to the physical memory 300 of the local node can access, as described above, the virtual memory space of the local node to access data that is physically stored within the RAM memory 300. Similarly, the local disk cache 294 couples to the persistent storage device 298 and can access a physical location that maintains in the local persistent storage data of the distributed shared memory.

FIG. 10 also depicts a remote operations element 274 that couples between the network 304 and the flow scheduler 272. The remote operations element 274 negotiates the transfer of data across the network 304 for moving portions of the data stored in the shared memory space between the nodes of the network. The remote operations element 274 can also request services from remote peers, i.e., invalidate to help maintain coherency or for other reasons.

FIG. 10 also depicts a policy element 290 that can be a software module that acts as a controller to determine the availability of resources, such as printer capabilities, hard-disk space, available RAM and other such resources. The policy controller can employ any of the suitable heuristics to direct the elements, such as the paging controller, disk directory manager, and other elements to dynamically distribute the available resources.

FIG. 10 further depicts a memory subsystem 270 that includes a RAM copyset 278 and a disk copyset 282. These copysets can manage copies of pages that are cached at a single node. The disk copyset 282 can maintain information on copies of pages that are stored in the local disk cache, which can be the local persistent memory. Similarly, the RAM copyset 278 can maintain information on copies of pages that are stored in the local RAM cache which can be the local RAM. These copysets encapsulate indexing and storage of copyset data that can be employed by applets or other executing code for purposes of maintaining the coherency of data stored in the shared memory space. The copyset elements can maintain copyset data that identifies the pages cached by the host node. Further, the copyset can identify the other nodes on the network that maintain a copy of that page, and can further identify for each page which of these nodes is the owner node, wherein the owner node can be a node which has write privileges to the page being accessed. The copysets themselves can be stored in pages of the distributed shared memory space.

The local RAM cache 276 provides storage for memory pages and their attributes. In one embodiment, the local RAM cache 276 provides a global address index for accessing the cached pages of the distributed memory and the attributes based on that page. In this embodiment, the local ram cache 276 provides the index by storing in memory a list of each global address cached in the local RAM. With each listed global address, the index provides a pointer into a buffer memory and to the location of the page data. Optionally, with each listed global address, the index can further provide attribute information including a version tag representative of the version of the data, a dirty bit representative of whether the RAM cached data is a copy of the data held on disk, or whether the RAM cached data has been modified but not yet flushed to disk, a volatile bit to indicate if the page is backed by backing store in persistent memory, and other such attribute information useful for managing the coherency of the stored data.

In the embodiment depicted in FIG. 10, the memory subsystem 270 provides the node access to the distributed memory space by the coordinated operation of the directory manager that includes the global RAM directory 280 and the global disk directory 284, the cache controller that includes the local RAM cache and the local disk cache elements 276 and 294, and the copyset elements which include the RAM copyset 278 and the disk copyset 282.

The directory manager provides a directory structure that indexes the shared address space. Continuing with the example of a paged shared address space, the directory manager of the subsystem 270 allows the host node to access, by global addresses, pages of the shared memory space.

Figure 11:
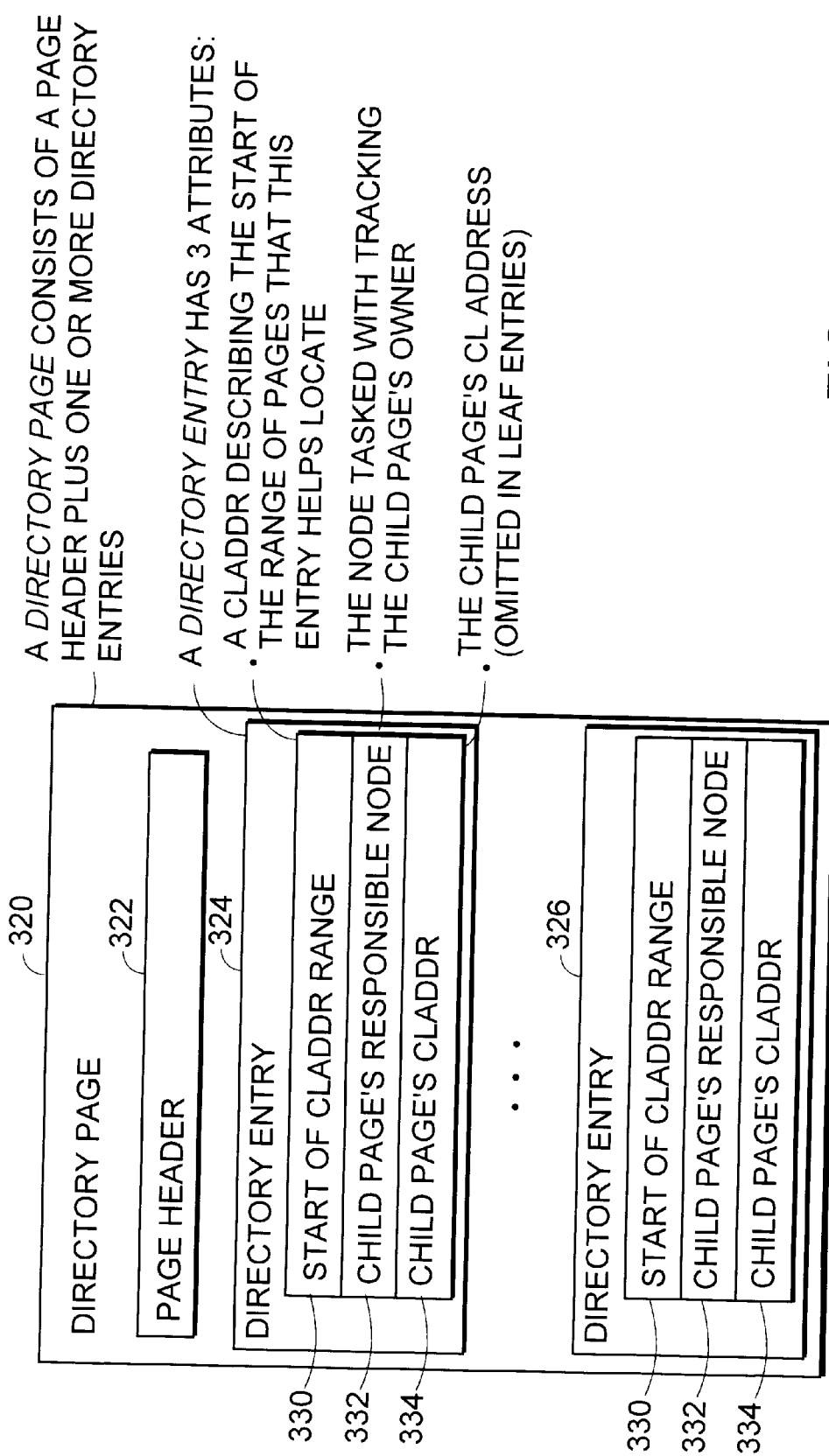
FIG. 11 illustrates a directory page that can be provided by a shared memory subsystem of the type depicted in FIG. 10.
Figure 12:
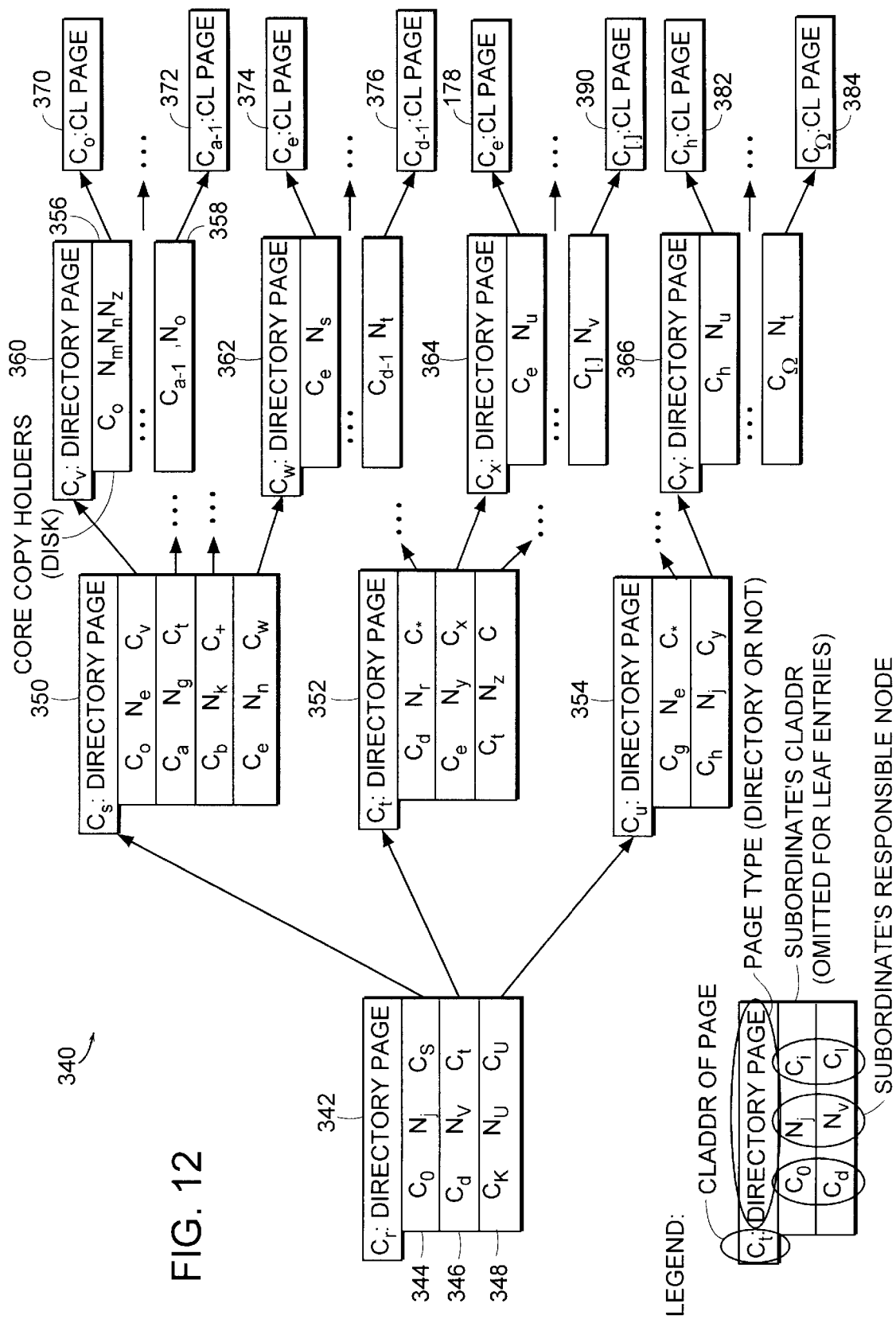
FIG. 12 illustrates a directory that can be distributed within a shared memory and formed of directory pages of the type illustrated in FIG. 11.

FIGS. 11 and 12 illustrate one example of a directory structure that provides access to the shared memory space. FIG. 11 depicts a directory page 320 that includes a page header 322, directory entries 324 and 326, wherein each directory entry includes a range field 330, a responsible node field 332, and an address field 334. The directory pages can be generated by a directory page generator that can be a software module controlled by the directory manager. It will be understood that the directory manager can generate multiple directories, including one for the Global disk and one for the Global RAM directories. The depicted directory page 320 can be a page of the global address space, such as a 4K byte portion of the shared address space. Therefore, the directory page can be stored in the distributed shared memory space just as the other pages to which the directory pages provide access.

As further depicted in FIG. 11, each directory page 120 includes a page header 322 that includes attribute information for that page header, which is typically metadata for the directory page, and further includes directory entries such as the depicted directory entries, 324 and 326, which provide an index into a portion of the shared address space wherein that portion can be one or more pages, including all the pages of the distributed shared memory space. The depicted directory page 320 includes directory entries that index a selected range of global addresses of the shared memory space. To this end, the directory generator can include a range generator so that each directory entry can include a range field 330 that describes the start of a range of addresses that that entry locates.

Accordingly, each directory page 320 can include a plurality of directory entries, such as entries 324 and 326, that can subdivide the address space into a subset of address ranges. For example, the depicted directory page 320 includes two directory entries 324 and 326. The directory entries 324 and 326 can, for example, subdivide the address space into two sub-portions. In this example, the start address range of the directory entry 324 could be the base address of the address space, and the start address range of the directory entry 326 could be the address for the upper half of the memory space. Accordingly, the directory entry 324 provides an index for pages stored in the address space between the base address and up to the mid-point of the memory space and, in complement thereto, the directory entry 326 provides an index to pages stored in the address space that ranges from the mid-point of the address space to the highest address.

FIG. 11 further depicts a directory page 320 that includes, in each directory entry, a responsible node field 332 and the child page global address field 334. These fields 332, 334 provide further location information for the data stored in pages within the address range identified in field 330.

FIG. 12 depicts a directory 340 formed from directory pages similar to those depicted in FIG. 9. FIG. 12 depicts that the directory 340 includes directory pages 342, 350–354, and 360–366. FIG. 12 further depicts that the directory 340 provides location information to the pages of the distributed shared memory space depicted in FIG. 12 as pages 370–384.

The directory page 342 depicted in FIG. 12 acts like a root directory page and can be located at a static address that is known to each node coupled to the distributed address space. The root directory page 342 includes three directory entries 344, 346, and 348. Each directory entry depicted in FIG. 12 has directory entries similar to those depicted in FIG. 11. For example, directory entry 344 includes a variable Co which represents the address range field 330, a variable Nj representative of the field 332, and a variable Cs representative of the field 334. The depicted root directory page 342 subdivides the address space into three ranges illustrated as an address range that extends between the address Co and Cd, a second address range that extends between the address Cd and Cg, and a third address range that extends between Cg and the highest memory location of the address space.

As further depicted in FIG. 12, each directory entry 344, 346, and 348 points to a subordinate directory page, depicted as directory pages 350, 352, and 354, each of which further subdivides the address range index by the associated directory entry of the root directory 342. In FIG. 11, this subdivision process continues as each of the directory pages 350, 352, and 354 each again have directory entries that locate subordinate directory pages including the depicted examples of directory pages 360, 362, 364, and 366.

The depicted example of directory pages 360, 362, 364, and 366 are each leaf entries. The leaf entries contain directory entries such as the directory entries 356 and 358 of the leaf entry 360, that store a range field 330 and the responsible node field 332. These leaf entries identify an address and a responsible node for the page in the distributed memory space that is being accessed, such as the depicted pages 370–384. For example, as depicted in FIG. 12, the leaf entry 356 points to the page 370 that corresponds to the range field 330 of the leaf entry 356, which for a leaf entry is the page being accessed. In this way, the directory structure 340 provides location information for pages stored in the distributed address space.

In the depicted embodiment of FIG. 12, a node selector can select a responsible node for each page, as described above, so that the leaf entry 356 provides information of the address and responsible node of the page being located. Accordingly, this directory tracks ownership and responsibility for data, to provide a level of indirection between the directory and the physical location of the data. During a memory access operation, the memory subsystem 270 passes to the responsible node indicated in the leaf entry 356 the address of the page being accessed. The shared memory subsystem of that node can identify a node that stores a copy of the page being accessed, including the owner node. This identification of a node having a copy can be performed by the RAM copyset or disk copyset of the responsible node. The node having a copy stored in its local physical memory, such as the owner node, can employ its local cache elements, including the local RAM cache and local disk cache to the identify from the global address signal a physical location of the data stored in the page being accessed. The cache element can employ the operating system of the owner node to access the memory device that maintains that physical location in order that the data stored in the page can be accessed. For a read-memory operation, or for other similar operations, the data read from the physical memory of the owner node can be passed via the network to the memory subsystem of the node requesting the read and subsequently stored into the virtual memory space of the requesting node for use by that node.

With reference again to FIG. 12, it can be seen that the depicted directory structure 340 comprises a hierarchical structure. To this end, the directory structure 340 provides a structure that continually subdivides the memory space into smaller and smaller sections. Further, each section is represented by directory pages of the same structure, but indexes address spaces of different sizes. As pages are created or deleted, a linker inserts or deletes the pages from the directory. In one embodiment, the linker is a software module for linking data structures. The linker can operate responsive to the address ranges to provide the depicted hierarchical structure. Accordingly, the depicted directory 340 provides a scaleable directory for the shared address space. Moreover, the directory pages are stored in the distributed address space and maintained by the distributed shared memory system. A root for the directory can be stored in known locations to allow for bootstrap of the system. Consequently, commonly used pages are copied and distributed, and rarely used pages are shuffled off to disk. Similarly, directory pages will migrate to those nodes that access them most, providing a degree of self-organization that reduces network traffic.

Figure 13:
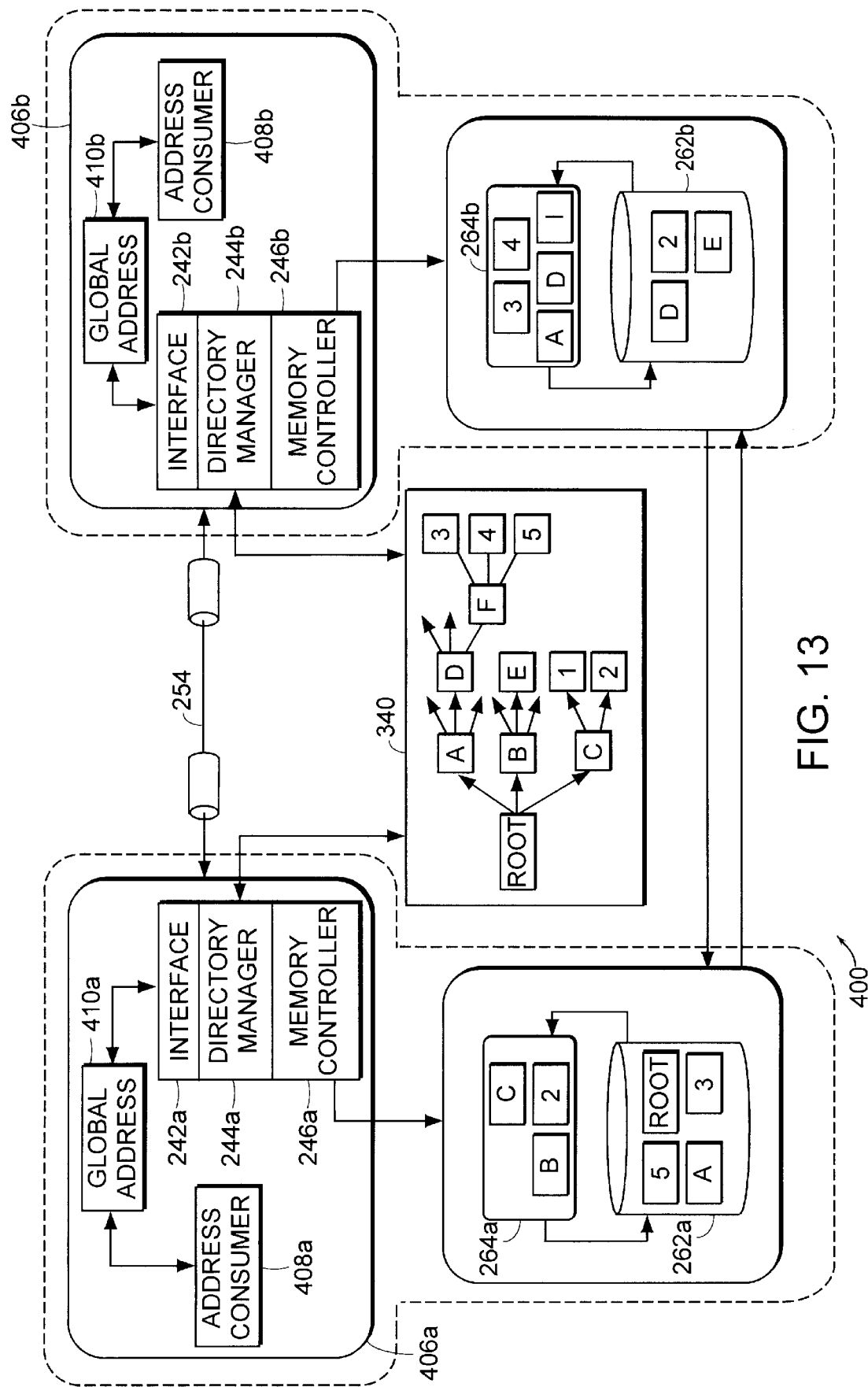
FIG. 13 illustrates in functional block diagram form a system that employs a directory according to FIG. 12 for tracking portions of a distributed shared memory.

FIG. 13 depicts the directory of FIG. 12 being employed by a system according to the invention. In particular FIG. 13 depicts a system 400 that includes two nodes, 406a and 406b, a directory structure 340, and a pair of local memories having volatile memory devices 264a and 264b, and persistent memory devices 262a and 262b. Depicted node 406a includes an address consumer 408a, a global address 410a, and interface 242a, a directory manager 244a and a memory controller 246a. Node 406b has corresponding elements. The nodes are connected by the network 254. The directory 340 has a root page, directory pages A–F, and pages 1–5.

Each node 406a and 406b operates as discussed above. The depicted address consumers 408a and 408b can be an application program, file system, hardware device or any other such element that requests access to the virtual memory. In operation, the address consumers 408a and 408b request an address, or range of addresses, and the directory manager can include a global address generator that provides the consumer with the requested address, or a pointer to the requested address. As addresses get generated, the respective directory managers 244a and 244b generate directory pages and store the pages in the directory structure 340. As depicted, the directory structure 340 tracks the portions of the address space being employed by the system 400, and physical storage for each page is provided within the local memories.

As shown in FIG. 13, the data associated with the directory pages are distributively stored across the two local memories and duplicate copies can exist. As described above and now illustrated in FIG. 13, the data can move between different local memories and also move, or page, between volatile and persistent storage. The data movement can be responsive to data requests made by memory users like application programs, or by operation of the migration controller described above. As also described above, the movement of data between different memory locations can occur without requiring changes to the directory 340. This is achieved by providing a directory 340 that is decoupled from the physical location of the data by employing a pointer to a responsible node that tracks the data storage location. Accordingly, although the data storage location can change, the responsible node can remain constant, thereby avoiding any need to change the directory 340.

RECOVERY

The system and methods described above allow a distributed system to share address space, including persistent storage for memory, and gracefully handle node failure. Since the RAM directory, disk directory, and file system are distributed over every node in the distributed shared system, failure of one node may leave a "hole" in the RAM directory, disk directory, file system, or some combination of the three.

The systems described throughout rely on two concepts to aid memory sharing and fault tolerance. Those concepts are quorum and heartbeat. Before describing quorum or hearbeat, however, the concept of an anchor node must be introduced.

Anchor nodes are special network nodes that retain a copy of the entire node directory database and may provide storage for other important system information such as copies of the root of disk directory trees. A node is configured as an anchor node when it is introduced to the network and this may be done by setting a value in a configuration file present on the node, or the node may be configured as an anchor using hardware techniques such as jumpers or special cabling. Anchor nodes may also store a complete list of all other anchor nodes in the network. Each anchor node may be provided with a list of all other anchor nodes by the system administrator or, on initialization, each anchor node may use a search protocol to locate other anchor nodes.

Quorum indicates that enough nodes remain functional in the system to provide proper data processing and memory sharing. Because the number of nodes present in a network may be very high, not all nodes participate in the computation of quorum. In order to reduce processing requirements, only "anchor" nodes participate in the quorum computation. In attempting to establish quorum, each anchor node may contribute one "vote." If the number of votes received is in excess of some predetermined threshold, then quorum is established and normal processing is effected. Quorum may also be used to gracefully operate when network failures result in the partitioning of the network into two or more regions. One of the partitions may continue to operate (because it is able to establish quorum) while the others cannot continue operation. In some embodiments the network administrator may assign more than one vote to certain anchor nodes in an attempt to bias operation of the network towards certain nodes.

"Heartbeat" refers to the periodic exchange of connectivity information between all nodes of the network. One node is assigned to monitor heartbeat information. Heartbeat monitors may be assigned on a per network, per partition, or per group basis. The identity of the heartbeat monitor is dynamically assigned and may, but is not required to, favor selection of anchor nodes as the heartbeat monitor. All other nodes connected to network are heartbeat "slaves," which means that those nodes report their operating status to the heartbeat monitor and receive periodic connectivity updates from the monitor.

Heartbeat information propagates in the following manner. Each heartbeat slave periodically transmits a member pulse to its local heartbeat monitor indicating to the monitor that it is functional. When the monitor receives the slave's member pulse, it updates its connectivity information. The monitor may store connectivity information as a bitmap, or any other data structure which allows such information to be stored and transmitted. The monitor periodically broadcasts the compiled connectivity information to the heartbeat slaves, which will be referred to as a "monitor pulse."

In the event that a heartbeat slave misses a deadline three times in a row for transmitting member pulse information, the heartbeat monitor assumes that the errant slave has ceased functioning and updates the stored connectivity information to reflect the change in status. Each surviving heartbeat slave is notified of the change in connectivity on the next monitor pulse. In the event the slave is unable to transmit information but can receive, the slave will receive the broadcasted notification that it is no longer part of the network.

Should the heartbeat monitor miss a deadline three times in a row for broadcasting the monitor pulse, each slave assumes that the heartbeat monitor has ceased functioning and each slave attempts to become the new heartbeat monitor. A slave may arbitrate to become the heartbeat monitor or a configuration file may be created that lists heartbeat monitors in order of preference and from which successive monitors may be selected.

Each node's responsibilities depend on whether it is a heartbeat monitor, anchor node, or both. Each case is summarized below.

Heartbeat monitor and anchor node

On every connectivity change, i.e., at every deadline for receiving member pulses, this node will recompute whether quorum exists based solely on its stored connectivity bitmap. Resultant quorum state is included in broadcasted monitor pulses. Received quorum state information from other anchor nodes is ignored.

Heartbeat monitor but not an anchor node

This node receives member pulses from all slaves. If a member pulse is received from an anchor node, this node immediately updates the current quorum state and transmits the current quorum state on the next monitor pulse.

Heartbeat slave and anchor node

Whenever there is a connectivity change, these nodes recompute quorum based solely on the connectivity information received from the heartbeat monitor. These nodes include the resultant quorum state in their member pulses. Quorum information received from the heartbeat monitor is ignored.

Heartbeat slave and not an anchor node

These nodes transmit no quorum information. These nodes receive updated quorum information from the heartbeat monitor's monitor pulses.

For embodiments where nodes are grouped, each group can elect a group heartbeat transmitter. The group heartbeat transmitter notifies a group level heartbeat monitor that the group it represents is active. The group level heartbeat monitor periodically broadcasts the status of the set of groups present in the network. This hierarchical grouping can be of arbitrary depth.

In some embodiments, quorum information is discarded after a certain period of time. This may be accomplished by associating a timer with quorum information (on heartbeat monitors and slaves) that is restarted whenever the node receives quorum information. Thus, when the last anchor node ceases functioning (and therefore ceases transmission of quorum information) non-anchors will know they no longer have quorum no later than the time-out periods for the timer.

As noted above, anchor nodes maintain a record of the current node database, i.e., anchor nodes record the current connectivity state of the network. Anchor nodes may store the node database to disk storage, or some other persistent storage mechanism, in order to provide backup during node failures. The node database may be written to a specific directory location. Updates to the database may be controlled by a centralized database. When an anchor nodes prepares to update the database, it may indicate the operation it is attempting to perform (add, delete, or change a node), data identifying the node for which an entry is changing, and the version number of the database that will be used if the update is successful.

In networks having more than one anchor node, anchor nodes must enter into an arbitration algorithm to perform a node database update. An anchor node that initiates the node database update assumes the role of "coordinator." The coordinator obtains a list of all the anchor nodes currently in the quorum set and each anchor node in this list assumes the roles of a "subordinate" anchor node for the purposes of the initiated update. While the database update is in progress, the coordinator and subordinates do not allow a second node database update to begin.

In networks having a single anchor node, the coordinator will obtain a list of anchor nodes that includes only the coordinator. In the event that the coordinator retrieves a list of anchor nodes that is empty, an error has occurred and the update is immediately terminated. in some embodiments the coordinator's first action is to check for quorum. If no quorum exists, then the update is immediately terminated.

RAM directory recovery

As described above, global RAM directory (GRD) pages are volatile pages that are not backed up to redundant, reliable, persistent disk storage and are frequently modified. These qualities make GRD pages highly vulnerable to node failure. Because GRD pages enable the location of other GRD pages, losing a GRD page can result in a section of the shared memory space becoming unfindable.

In brief overview, when a node in the network fails, all other nodes cease processing. The GRD is discarded, synchronously repopulated with the contents of the surviving nodes' local RAM cache, and processing resumes.

The notions of "node state" and "network state" should be introduced. A node has four states: normal, notified, quiescent, and rebuilding. In the normal state, a node in functioning normally. When notified of another node's failure, the node enters the "notified" state and waits for all its local processing to cease. Once all processing has ceased, the node enters the quiescent state and discards all GRD pages it has cached. When the node receives a "start repopulating" message from the recovery coordinator, it leaves the quiescent state and enters the Rebuilding state. When the node reports to the recovery coordinator that it has completed rebuilding, the node re-enters the normal state.

Network state has similar properties, except that the network is in the notification state if any node is in the notification state, the network is in the quiescent state only when all nodes are in the quiescent state, the network is in the rebuilding state if any nodes are in the rebuilding state, and the network is in the normal state when the first node returns to the normal state.

When an anchor node notices that a node has failed (via the heartbean mechanism) or receives a request to rebuild the GRD from another node that had detected a node failure, it enters the "notified" state and negotiates with the other anchors to become the recovery coordinator, and thereby gain control of the rebuild. The negotiation to control the rebuild can rely on many different qualities. For example, anchor nodes may negotiate based on identification code, with lower assigned identification codes "winning" the negotiation. If the anchor node loses the negotiation, it defers to the winner, ceases attempting to control the rebuild, waits for a "start recovery" message, and proceeds as described above.

Otherwise, if the anchor node controls the rebuild, it sends a "quiesce for recovery" message to all nodes and waits to receive all the replies. This can be a synchronous process, although it may be desirable for it to be asynchronous to accommodate node of varying response speeds and capabilities.

A non-anchor node will first receive the "quiesce for recovery" message from the recovery coordinator anchor node. This will cause the node to enter the "notified" state. Once in the notified state, all local processing activity is stopped, and errors should be returned for most received remote invocations. This state must either complete all invalidations or reliably fail them. Otherwise, a page could be modified while disconnected copyholders are outstanding. Once all local processing has terminated, a reply to the "quiesce for recovery" message is sent to the coordinator and the node enters the quiescent state.

During the quiescent state the node removes all GRD pages from its local RAM cache, whether dirty or not, discards copyset information, and waits for a "start repopulating" message.

Once all replies have been received by the recovery coordinator, it sends a "start repopulating" message to all nodes and waits for their reply that repopulation is complete.

When the node receives a "start repopulating" message, it enters the rebuilding state and sends a reply to the message. For any page remaining in the node's local RAM cache, the node sends a message to the recovery coordinator identifying the page by global address and requesting to become the responsible node and owner of the page. IF successful, the node owns the page. If not successful, the node should drop the page from its local RAM cache or register with the new owner to become a copychild of the page.

Once the node has attempted to become owner of every page existing in its local RAM cache, it sends a "repopulation complete" message to the recovery coordinator and waits to receive a "resume operations" message. Once every node has sent a "repopulation complete" message to the recovery coordinator, it sends a "resume operations" message to all nodes in the network.

If a node fails during the GRD rebuild process, it can either be ignored, or the rebuild process can be restarted.

Disk directory recovery

Pages of the GDD are stored by multiple nodes in the network to provide some degree of tolerance for node failure. When a node fails, persistent data and directory pages stored by the failed node need to be reduplexed, in order to survive subsequent failures. There are two mechanisms used to perform this reduplexing function. The first is the normal page activation process. Whenever a page is activated, the primary core holder checks to ensure that this page has not fallen below a minimum number of core holders threshold. If it has, the primary core holder is responsible for finding a new core holder. This mechanism is demand driven, i.e., this mechanism results in pages being reduplexed when they are explicitly accessed. The second mechanism uses a background reduplexer that asynchronously schedules the activity.

One of the anchor nodes present in a network is designated as the primary anchor node (PAN). The PAN maintains the primary copy of the global disk directory (GDD) root page. The PAN is assigned dynamically. Anchor nodes may arbitrate to become the PAN in the event of a PAN failure, or a configuration file may be provided which lists a series of nodes that may serve as the PAN. In either case, quorum must still exist. Anchor nodes that are not the PAN behave in the same manner as non-anchor nodes with respect to the reduplexing process.

In order to provide asynchronous GDD recovery, the PAN maintains and controls the background reduplexing process. The PAN receives notification from other nodes when they detect GDD pages that are below minimum core holder threshold. These GDD pages are typically detected during normal directory traversal operations. The PAN reduplexes by activating pages, as described above.

Nodes maintain state regarding GDD pages that have less than the threshold number of core holders that they have encountered. When such a page is encountered, the node notifies the PAN to reduplex the page, and then monitors the PAN. Should the PAN fail during reduplexing, the node waits for the other anchor nodes to select a new PAN (or until a new PAN is assigned from a configuration file) and transmits the reduplex request to the new PAN. The communication subsystem is utilized to monitor the node states for this process. The node state is also used to reinitiate reduplexing operations that were incomplete due to resource constraints, such as available disk space.

Various forms of network outages can cause sets of nodes to become partitioned into separate aggregations. When this occurs, duplexed copies of pages may be split between aggregations, i.e., one core holder for a page is present in the network while another is contained in the aggregation. The quorum set, which is a majority of the original set of anchor nodes, is required for write access to the data and directory pages. An aggregation of nodes that are not in the quorum set, therefore, may serve data pages but cannot write to them. This inability to modify pages without quorum is enforced by having the anchor nodes disallow modifications to the GDD root page when quorum is lost. If a node attempts to modify a page without access to all of its core holders, it first will attempt to modify the set of core copy holders, which requires the page's GDD page to be modified. This write to the GDD page will itself require a right to the GDD that stores its core copyset, and so on, until finally the node will attempt to modify the GDD root page. Since this operation will be failed by the anchor nodes, the original write to a normal data page will fail. The anchor nodes' enforcement of quorum on this GDD root page, prevents data corruption in the presence of a partitioned network.

File system recovery

Another result of node failure is the generation of file system metadata inconsistencies. File system metadata inconsistencies take a number of forms, including (1) inconsistency between the file system representation of allocated pages and the global disk directory (GDD) of allocated or deallocated pages resulting from failure during allocation or deallocation of pages; (2) erroneous file attributes contained in a file Inode; (3) inconsistent pages from the file system resulting from failure during a transaction that requires multiple flush operations to record updates, such as updates that span multiple disk blocks (directory updates and fileset operations); (4) Inode directory errors resulting from failures of single page and multiple page updates; (5) inconsistency between file attributes as stored in the Inode and file attributes as stored in a file's Inode and a file's directory entry resulting from a failure during the synchronization process.

File system transactions involving GDD updates are transactions that include allocation, deallocation, and unallocation, i.e., freeing disk space while keeping address space reserved, operations. These transactions require that the state of the pages being allocated are updated in the file system metadata structures and also require the invocation of GDD allocation, deallocation, or unallocation functions. In order to perform these functions in a manner to allows the file system to recover from a node failure, file system pages must be associated with a recovery handle, which is transmitted to the GDD when the page is allocated. The recovery handle is any identification entity that uniquely identifies a page such as the file system object identification code.

The file system provides a call back routine that can be invoked by the GDD to determine the current state of allocation of specified pages according to the file system. For allocation of pages, the file system must invoke the GDD allocation function before attempting the transaction. After the GJDD allocation successfully completes the file system may permanently record the allocation state. If the transaction fails to complete the GDD may have allocated pages that the file system will not recognize.

For deallocation or unallocation of pages, the file system must report permanently the deallocation or unallocation before invoking the GDD function to deallocate or unallocate the pages. If the transaction fails to complete, the GDD may end up with file system pages that the file system does not recognize.

The GDD may call the file system to verify pages associated with the file system object ID. The GDD passes to the file system what it perceives the state of allocation to be. The file system searches its metadata structures to identify the pages and reports back to the GDD only if it disagrees with the GDD.

File Inode updates require updating metadata information contained in the file's Inode. These attributes may include file time stamps, file flags, and the end of file mark. Attributes may be updated directly by various set file attributes operations or, as in the case of time stamps, they may be set indirectly as part of other file system operations. Since the Inode does not span disk blocks, i.e., the Inode occupies a single page, the update either succeeds completely or fails completely. Accordingly, the file system will not detect inconsistency in the file system metadata. This is true for file size updates also because, even though file size of a primary stream is stored in both the file Inode and the data stream descriptor, both of these metadata structures reside on the same page in the same disk block.

The file system metadata updates that span multiple pages include directory entry updates, such as create file or directory, delete file or directory, and rename file or directory, file set updates (such as creation and deletion, or super root updates or creations). Each of these multiple page metadata updates is vulnerable to node failure during the transaction and each must be handled in a specific manner.

Directory entry insertion and deletion can require multiple flushes involving multiple pages. Depending on the distribution on the directory entries, the addition or deletion of a file may affect a page containing the entry, the pages containing the previous and the next entries in the list, and the Inode page containing the name hash table. In the case of directory entry insertion, if no free slot can be found in existing directory pages, then a new entry page will be allocated.

A transaction to insert or delete a directory entry must first mark the directory Inode with the type of transaction. Marks may include: create; create_directory; rename; rename target; and delete. The Inode number of the file being inserted or removed is also stored in the directory Inode. The directory Inode is then flushed, which marks the beginning of the update transaction.

Once the directory Inode is flushed, the directory is updated with the entry modifications, along with the pages containing the previous and next entries in the sort and hash list and the hash table Inode page. These may occur in parallel. The transaction mark in the directory Inode is then cleared and the Inode written out. This marks the end of the transaction. A directory Inode page that has a transaction mark indicates that the directory was the target of an incomplete transaction and the directory needs to be recovered. The file system recovers directory Inode pages by invoking a function that verifies and repairs individual directories. The functions should check and repair any inconsistencies found in the directory, such as broken sort/hash linked lists, inconsistent free block linked lists, or incorrect hash table bucket entries. If the function fails to repair the directory, the directory should be marked as corrupt and future access to the directory should be denied. Otherwise, the file entry Inode number is extracted from the transaction mark and connectivity to the Inode is verified. Once verified, the transaction mark in the directory Inode is cleared and the directory Inode page is flushed. This marks the end of recovery.

File creation and directory creation involves allocation of new Inode pages and, for directories, allocation of the first directory entry page, and the subsequent insertion of the new file or directory into the parent directory. The file system implements file or directory creation by first calling the Inode directory function to return a new Inode. The transaction is marked in the parent directory Inode and flushed. All data structure updates are performed under this transaction mark. Once these updates are flushed, the transaction mark in the directory Inode is cleared.

A transaction mark found in the parent Inode (i.e., the Inode of the parent directory) indicates that a node failure occurred during a transaction. In order to recover from the failed file or directory creation transaction, the file or directory Inode is located using the transaction mark contained in the parent directory Inode. The parent directory is recovered in a manner similar described above, but the parent Inode transaction mark is not immediately cleared. If the parent directory can be repaired or is consistent and the new file Inode or the new directory Inode is apparent from the transaction mark, then the transaction mark is cleared in the parent Inode and flushed. In this case, the transaction is complete. Otherwise, the file system must undo the transaction.

To undo the transaction, the file system must determine if the transaction is a create directory or create file transaction. If the failed transaction was for the creation of a directory and the file system has the pointer to the directory entry page in the Inode page, then it may simple deallocate the directory entry page. Otherwise, the file system must call the Inode directory function to free the Inode, remove the entry from the parent directory if an entry has been created, and then clear the transaction mark from the parent Inode and flush it.

File deletion and directory deletion are performed in two phases. In brief overview, the file or directory is first marked for deletion and its entries removed from the parent directory. Then, when all open handles to the file or the directory have been closed, it is physically deleted.

To recover from a failed file deletion or directory deletion transaction, a file system should, during the mark for delete phase, set a transaction mark in the file Inode or the directory Inode to indicate that it is being deleted. The Inode is then flushed. The file entry or directory entry is then removed from the parent directory using the general method described above. The transaction mark set in the parent Inode indicates that a deletion transaction is occurring. Since directory look up for the file will now fail, no new file handles can be opened. However, existing handles may still be used to access the file or directory.

Once all the existing handles to the file or directory have been closed, and if the target of the transaction is a directory, then all directory entry pages are deallocated. The Inode is lazily returned to a local lookaside list. Inodes are allocated and deallocated from the global pool in groups, for performance and scaling reasons. However Inodes may be allocated and deallocated singly. If a parent directory Inode or a file/directory Inode is found with a transaction mark indicating an incomplete delete transaction, then the deletion must be recovered.

However, if the parent Inode has a delete transaction mark, then the Inode of the file/directory being deleted must be located using the transaction mark in the parent Inode. If the file/directory Inode indicates that the target of the delete is a directory, all directory entry pages must be deallocated. The Inode is returned to the local pool, for later disposition. Once the removal of the file/directory's entry has been verified, the parent Inode's transaction mark may be cleared and the parent Inode can be flushed. This step completes the recovery of the deletion.

A rename operation is effected by performing an insert to a new directory and a delete from an old directory. However, the insertion transaction is not cleared until both the insertion and deletion successfully complete. This allows the system to either "back out" of an unsuccessful rename operation or to complete the failed rename operation when it is encountered, depending on the amount of progress made before failure.

Fileset creation and deletion also requires multiple page flushes which are vulnerable to a node failure during the transaction. Fileset creation involves the allocation and initialization of the new fileset page, the fileset's Inode directory, and the root directory. To recover a failed fileset creation, the file system must begin by allocating the necessary pages to initialize the fileset, the Inode directory, and the root directory. Root directory pages are allocated with the file system object ID pointing to the root directory and fileset related pages are initialized with the fileset ID only. Should a node fail at this point, the allocated pages will be lost. The super root is then updated to record the new fileset. If this step is successful, the fileset creation transaction is successful.

A fileset deletion operation will deallocate the fileset page, the Inode directory, and the root directory. This transaction begins by marking the fileset as the target of a delete transaction. The fileset page is flushed and the root directory is deleted. Once the root directory is deleted, all free Inodes are deallocated and this step may be repeated as many times as necessary. The super root is then updated to remove the fileset from the super root's set of filesets. Should a node fail at this time, the fileset page will be lost but can be recovered via the GDD callback mechanism. The fileset deletion is completed by deleting the fileset pages. The Inode directory is a set of persistent data structures used to track all the Inodes in a fileset. Using the Inode directory, the file system can locate any Inode in the fileset. The Inode directory contains two major components (1) the free Inode list and (2) the Inode bit map.

As noted above, file attributes are duplicated in the file Inode and its directory entry in order to improve the performance of directory queries, one of the most important performance measures in the file systems. Since any file attributes change must be propagated to both structures, the number of flushes required to update a file or directory may double. Since updates to the :node page and the directory entry page are separate, inconsistencies may arise between the two. Inconsistencies may be reduced by providing the Inode in the directory entry with a synchronization version number. The two are synchronized if they have the same synchronization version number. Whenever the Inode is updated, its synchronization version number is incremented. Then, the directory entry page is locked and the file attributes in the Inode are copies to the directory entry, including the synchronization version number. The entry pages is not yet flushed, but the Inode page is flushed according to the strategies described above. If at this point a node fails, the directory entry in the Inode will not be in synchronization with each other. Once the Inode is flushed, the entry page is also flushed independently.

During a file open or directory open, the Inode synchronization version is compared with the directory entry's synchronization version. If they do not match, the directory entry is not synchronized with the :node entry and the directory entry must be updated.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. In a system for providing distributed control over data, a method for continuing operation after a node failure, the method comprising:

(a) providing a plurality of nodes inter-connected by a network which periodically exchange connectivity information;

(b) storing on each node an instance of a data control program for manipulating data to provide multiple, distributed instances of the data control program;

(c) interfacing each instance of the data control program to a distributed shared memory system that provides distributed storage across the inter-connected node and that provides addressable persistent storage of data;

(d) operating each instance of the data control program to employ the shared memory system as a memory device having data contained therein, whereby the shared memory system maintains multiple, persistent copies of data distributed among more than one network node;

(e) determining from the exchanged connectivity information the failure of a node;

(f) determining a portion of the data for which the failed node was responsible; and (g) storing a copy of the portion of the data for which the failed node was responsible in persistent storage hosted by a surviving node.

2. The method of claim 1 wherein step (a) further compromises:

(a-a) providing a plurality of nodes interconnected by a network;

(a-b) designating a heartbeat monitor node from the plurality of interconnected nodes;

wherein the plurality of nodes periodically transmit information to the heartbeat monitor node and the heartbeat monitor node periodically broadcasts information to the plurality of the nodes.

3. The method of claim 1 wherein step (a) further comprises:

(a-a) providing a plurality of nodes interconnected by a network, the nodes organized into hierarchical groups of nodes;

(a-b) designating a heartbeat monitor node for each group of nodes, wherein each node in a group periodically transmits information to the heartbeat monitor node for the group, each heartbeat monitor node periodically broadcasts information to the nodes belonging to its group, and the plurality of heartbeat monitor nodes exchange information.

4. The method of claim 2 wherein step (e) comprises determining the failure of a node from the absence of exchanged information from the node.

5. The method of claim 1 wherein step (d) comprises operating each instance of the data control program to employ the shared memory system as a memory device having data contained therein, whereby the shared memory system uses a directory to coordinate access to data stored in volatile memory elements associated with each node and maintains multiple, persistent copies of data distributed among more than one network node.

6. The method of claim 5 wherein step (f) further comprises:

(f-a) determining a portion of the data which the failed node had stored in its associated volatile memory element; and (f-b) determining a portion of the data which the failed node had stored in its associated persistent memory element.

7. The method of claim 5 wherein step (g) comprises rebuilding the volatile memory directory.

8. In a system for providing distributed control over data, a method for continuing operation after a node failure, the method comprising:

(a) providing a plurality of nodes inter-connected by a network which periodically exchange connectivity information;

(b) storing on each node an instance of a data control program for manipulating data to provide multiple, distributed instances of the data control program;

(c) interfacing each instance of the data control program to a globally addressable data store that provides distributed storage across the inter-connected node and that provides addressable persistent storage of data;

(d) operating each instance of the data control program to employ the globally addressable data store as a memory device having data contained therein, whereby the globally addressable data store maintains multiple, persistent copies of data distributed among more than one network node;

(e) determining from the exchanged connectivity information the failure of a node;

(f) determining a portion of the data for which the failed node was responsible; and (g) storing a copy of the portion of the data for which the failed node was responsible in persistent storage hosted by a surviving node.

9. The method of claim 8 wherein step (a) further compromises:

(a-a) providing a plurality of nodes interconnected by a network;

(a-b) designating a heartbeat monitor node from the plurality of interconnected nodes;

wherein the plurality of nodes periodically transmit information to the heartbeat monitor node and the heartbeat monitor node periodically broadcasts information to the plurality of the nodes.

10. The method of claim 8 wherein step (a) further comprises:

(a-a) providing a plurality of nodes interconnected by a network, the nodes organized into hierarchical groups of nodes;

(a-b) designating a heartbeat monitor node for each group of nodes, wherein each node in a group periodically transmits information to the heartbeat monitor node for the group, each heartbeat monitor node periodically broadcasts information to the nodes belonging to its group, and the plurality of heartbeat monitor nodes exchange information.

11. The method of claim 9 wherein step (e) comprises determining the failure of a node from the absence of exchanged information from the node.

12. The method of claim 8 wherein step (d) comprises operating each instance of the data control program to employ the globally addressable data store as a memory device having data contained therein, whereby the globally addressable data store uses a directory to coordinate access to data stored in volatile memory elements associated with each node and maintains multiple, persistent copies of data distributed among more than one network node.

13. The method of claim 12 wherein step (f) further comprises:

(f-a) determining a portion of the data which the failed node had stored in its associated volatile memory element; and (f-b) determining a portion of the data which the failed node had stored in its associated persistent memory element.

14. The method of claim 12 wherein step (g) comprises rebuilding the volatile memory directory.

* * * * *